(12) United States Patent
Kamiya et al.

(10) Patent No.: US 7,559,658 B2
(45) Date of Patent: Jul. 14, 2009

(54) AUTO FOCUS PROJECTOR WITH SHORT FOCUS ADJUSTMENT TIME

(75) Inventors: Yasutaka Kamiya, Shiojiri (JP); Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 423 days.

(21) Appl. No.: 11/322,285

(22) Filed: Jan. 3, 2006

(65) Prior Publication Data

US 2006/0170877 A1  Aug. 3, 2006

(30) Foreign Application Priority Data

Jan. 6, 2005   (JP) ............... 2005-001643
Jun. 2, 2005   (JP) ............... 2005-162438

(51) Int. Cl.
*G03B 3/00* (2006.01)
*G03B 21/14* (2006.01)

(52) U.S. Cl. ............... 353/101; 353/69; 353/70

(58) Field of Classification Search ............... 353/101, 353/69, 70; 348/359, 745; 359/649, 650, 359/651, 694, 696, 697, 698
See application file for complete search history.

(56) References Cited

U.S. PATENT DOCUMENTS

| | | | | |
|---|---|---|---|---|
| RE36,060 E | * | 1/1999 | Miyashita | 348/748 |
| 6,592,228 B1 | * | 7/2003 | Kawashima et al. | 353/101 |
| 6,886,946 B2 | * | 5/2005 | Eguchi | 353/101 |
| 7,165,849 B2 | * | 1/2007 | Masuzawa et al. | 353/101 |
| 7,281,807 B2 | * | 10/2007 | Plut | 353/119 |
| 2004/0114115 A1 | * | 6/2004 | Runco | 353/101 |

FOREIGN PATENT DOCUMENTS

| | | |
|---|---|---|
| JP | A 06-186474 | 7/1994 |
| JP | A 08-292496 | 11/1996 |
| JP | A 09-130712 | 5/1997 |
| JP | A-11-119183 | 4/1999 |
| JP | A-2001-255446 | 9/2001 |
| JP | A-2004-045912 | 2/2004 |

* cited by examiner

*Primary Examiner*—William C Dowling
*Assistant Examiner*—Ryan Howard
(74) *Attorney, Agent, or Firm*—Oliff & Berridge, PLC

(57) ABSTRACT

A projector comprising a light modulating device which modulates light beams emitted from a light source, according to image information, to form an optical image; a projection optical device, the projection optical device including a projection lens, which has a plurality of lenses, that enlarges and projects the optical image onto the screen; a focal position changing unit, to perform focus adjustment on the image; a setting input unit through which automatic adjustment information for changing the focal position to an in-focus position where the projected image is in an in-focus state is input; and a focus adjustment control unit which controls the focal position changing unit until the projected image is in the in-focus state.

7 Claims, 15 Drawing Sheets

AUTO FOCUS PROJECTOR WITH SHORT FOCUS ADJUSTMENT TIME

BACKGROUND

1. Technical Field

The present invention relates to a projector.

2. Related Art

There have been known projectors each having a light modulating device for modulating light beams emitted from a light source according to image information to form an optical image and a projection lens for enlarging and projecting the optical image formed by the light modulating device onto a screen.

This type of projector needs to change the relative position of a plurality of lenses constituting the projection lens (to move the position of a focus lens (focal position), contributing to focus adjustment, of the plurality of lens relative to the other lenses in the direction of the optical axis) for the focus adjustment such that the optical image is formed on the screen. In addition, the projector performing this focus adjustment has been disclosed (for example, see JP-A-9-130712).

The projector disclosed in JP-A-9-130712 can perform electromotive focus adjustment (manual adjustment control) in which, when a user pushes an electromotive focus far switch or an electromotive focus near switch, a focal position is changed for the time for which the switch is pushed, and automatic focus adjustment (automatic adjustment control) in which, when the user pushes an automatic focus switch, the focal position is changed to a position where the image projected onto the screen is in an in-focus state.

In the automatic adjustment control, for example, the following method is generally used (for example, see JP-A-6-186474 or JP-A-8-292496).

First, a predetermined adjustment pattern image is projected onto the screen. Then, the adjustment pattern image is captured while the focal position is being changed, and the captured adjustment pattern image is analyzed. Subsequently, an in-focus position where the projected image is in the in-focus state is determined, and the focal position is set to the in-focus position.

However, in the above-mentioned focus adjustment, generally, a variable range where the focal position can be changed mechanically (hereinafter, referred to as a mechanical limit range) is set to be wider than a design range defined in the specifications of the projection lens, considering the margin of focus adjustment or manufacturing errors of the projection lens.

Therefore, when the mechanical limit range is set as described above, the focal position is changed within the wide range in the automatic adjustment control, so that much time is taken to perform focus adjustment.

SUMMARY

An advantage of some aspects of the invention is that it provides a projector capable of shorten a focus adjustment time in automatic adjustment control.

According to an aspect of the invention, a projector includes a light modulating device which modulates light beams emitted from a light source according to image information to form an optical image; a projection optical device which enlarges and projects the optical image onto a screen, the projection optical device including a projection lens which has a plurality of lenses and enlarges and projects the optical image onto the screen by means of the plurality of lenses; and a focal position changing unit which changes a focal position, which is a relative position of the plurality of lenses, to perform focus adjustment on the image enlarged and projected onto the screen; a setting input unit through which automatic adjustment information for changing the focal position to an in-focus position where the projected image is in an in-focus state is input; and a focus adjustment control unit which performs automatic adjustment control in which the focal position changing unit is driven until the projected image is in the in-focus state to change the focal position, on the basis of the automatic adjustment information. When a variable range is defined as a range where the focal position can be changed from a near end where the projected image can be adjusted to the in-focus state when a projection distance to the screen is short to a far end where the projected image can be adjusted to the in-focus state when the projection distance to the screen is long, the variable range in the automatic adjustment control is set to be narrower than a variable range where the relative position of the plurality of lenses is mechanically changed.

In this aspect, the focal position, which is the relative position of the plurality of lens, means the position of a focus lens, contributing to focus adjustment, of the plurality of lenses relative to the other lenses.

In this aspect, as in the related art, a variable range where the focal position can be changed mechanically (hereinafter, referred to as a mechanical limit range) is set to be wider than a range defined in the specifications of the projection lens, considering the margin of focus adjustment or manufacturing errors of the projection lens. In addition, the variable range in the automatic adjustment control is set to be narrower than the mechanical limit range. Therefore, in the automatic adjustment control, the variable range where the focal position is changed is narrow, and thus an in-focus position where a projected image is in an in-focus state can be rapidly determined, which results in a short focus adjustment time.

Further, in the above-mentioned structure, preferably, the setting input unit is formed such that it can have manual adjustment information for changing the focal position by a predetermined amount input thereto, and the focus adjustment control unit performs manual adjustment control for causing the focal position changing unit to be driven to change the focal position by a predetermined amount, on the basis of the manual adjustment information. In addition, preferably, the variable range in the automatic adjustment control is set to be narrower than the variable range in the manual adjustment control.

In this aspect, for example, the variable range in the manual adjustment control is set to be substantially equal to the mechanical limit range. Therefore, it is possible to perform focus adjustment using the manual adjustment control unit in the range where the focus adjustment has not been performed by the automatic adjustment control. Thus, it is possible to shorten the focus adjustment time in the automatic adjustment control, and to ensure a wide focus range in the manual adjustment control, which results in an improvement in convenience to a user.

Furthermore, in the above-mentioned structure, it is preferable that the variable range in the automatic adjustment control be set to be narrower at the far end than the variable range where the focal position can be mechanically changed.

However, when the focus adjustment is performed on a projected image at the far end where the projected image can be adjusted to the in-focus state when a projection distance to the screen is long, generally, a variation in the projection image with respect to the change of the focal position (focus displacement) becomes small. Therefore, in the automatic adjustment control, when the focus adjustment is performed in a state in which the focal position is changed from a predetermined position to the far end, it takes a long time to determine the in-focus position. In addition, the variation in the projected image (focus displacement) when the focal position is changed from the predetermined position to the far end is so small that the user cannot recognize it with eyes. Therefore, in the automatic adjustment control, when focus adjustment is performed in the state in which the focal position is changed from the predetermined position to the far end, unnecessary time is spent to determine the in-focus position.

According to this aspect of the invention, since the variable range in the automatic adjustment control is set to be narrower at the far end side than the mechanical limit range, it is possible to stop the focus adjustment at a predetermined far-end-side limit position which is set in the narrow range, and thus to effectively shorten a focus adjustment time without wasting time to determine the in-focus position.

Moreover, in the above-mentioned structure, it is preferable that the variable range in the automatic adjustment control be set to a range defined in the specifications of the projection lens.

In this structure, the variable range in the automatic adjustment control is set as follows.

For example, the operator arranges a screen at a position separated from a projector equipped with a reference projection lens (master lens) having standard optical characteristics by the shortest projection distance or the longest projection distance defined in the specifications of the projection lens, and measures focal positions (a near-end-side design limit position and a far-end-side design limit position), which are relative positions of a plurality of lenses constituting the standard projection lens, where an image enlarged and projected on the screen is in an in-focus state. The operator sets the variable range of the projector, which is a finished product, in the automatic adjustment control to a range from the near-end-side design limit position to the far-end-side design limit position. In this case, at least one of the near-end-side and far-end-side limit positions of the variable range in the automatic adjustment control may be set to the near-end-side design limit position or the far-end-side design limit position.

Further, for example, actually, the operator arranges the screen at a position separated from a projector, which is a finished product, by the shortest projection distance or the longest projection distance defined in the specifications of the projection lens, and measures focal positions (a measured near-end-side limit position and a measured far-end-side limit position), which are the relative positions of a plurality of lenses constituting the projection lens, where an image enlarged and projected on the screen is in an in-focus state. The operator sets the variable range in the automatic adjustment control to a range from the measured near-end-side limit position to the measured far-end-side limit position. In this case, at least one of the near-end-side and far-end-side limit positions of the variable range in the automatic adjustment control may be set to the measured near-end-side limit position or the measured far-end-side limit position.

According to this aspect of the invention, as described above, since the variable range in the automatic adjustment control is set to the range defined in the specifications of the projection lens, it is possible to set the variable range in the automatic adjustment control to a proper range, and thus to shorten a focus adjustment time required for appropriate focus adjustment.

Further, in the above-mentioned structure, it is preferable that a far-end-side limit position of the variable range in the automatic adjustment control be set to the focal position where the projected image is in the in-focus state at the longest projection distance defined in the specifications of the projection lens.

In the aspect of the invention, the far-end-side limit position of the variable range in the automatic adjustment control is set to the measured far-end-side limit position. Therefore, since at least the far-end-side limit position of the variable range in the automatic adjustment control is set as described above, it is possible to effectively shorten a focus adjustment time without wasting time to determine the in-focus position at the far end. In addition, for example, in the automatic adjustment control, in a case in which the in-focus position where a projected image is in the in-focus state is determined while the focal position is being changed, even when the focal position is set to the far-end-side limit position of the variable range in the automatic adjustment control so that the far-end-side limit position is determined as the in-focus position, it is possible to properly set the in-focus position and to properly perform focus adjustment since the limit position is set to the measured far-end-side limit position as described above.

Furthermore, in the above-mentioned structure, it is preferable that a far-end-side limit position of the variable range in the automatic adjustment control be set corresponding to the focal position where the projected image is in the in-focus state at the shortest projection distance defined in the specifications of the projection lens.

According to this structure, the measured near-end-side limit position is obtained as described above. The far-end-side limit position of the variable range in the automatic adjustment control is set to a position obtained by changing the measured near-end-side limit position by a predetermined amount. Therefore, since at least the far-end-side limit position of the variable range in the automatic adjustment control is set as described above, it is possible to effectively shorten a focus adjustment time without wasting time to determine the in-focus position at the far end. In addition, since the far-end-side limit position is set by the measured near-end-side limit position, it is possible to set the far-end-side limit position at a short distance between the screen and the project (the distance therebetween is the shortest projection distance). Thus, it is possible to reduce a working space required for setting the far-end-side limit position and thus to easily set the far-end-side limit position in a projector manufacturing place.

Furthermore, preferably, the projection optical device further includes a zoom position changing unit which changes a zoom position, which is a relative position of the plurality of lenses, to perform zoom adjustment on the projected image. The zoom position changing unit is formed so as to change the zoom position from a tele-end-side zoom position where the projected image has a minimum image contour to a wide-end-side zoom position where the projected image has a maximum image contour. At least one of near-end-side and far-end-side limit positions of the variable range in the automatic adjustment control is set to one of near-end-side and far-end-side focal positions. Of a shortest tele-end-side focal position where the projected image is in the in-focus state at the shortest projection distance defined in the specifications of the projection lens when the zoom position is the tele-end-side zoom position and a shortest wide-end-side focal position where the projected image is in the in-focus state at the shortest projection distance when the zoom position is the wide-end-side zoom position, the near-end-side focal position is the focal position at the near end side. Of a longest tele-end-side focal position where the projected image is in the in-focus state at the longest projection distance defined in the specifications of the projection lens when the zoom position is the tele-end-side zoom position and a longest wide-end-side focal position where the projected image is in the in-focus state at the longest projection distance when the zoom position is the wide-end-side zoom position, the far-end-side focal position is the focal position at the far end side.

In this structure, the zoom position, which is the relative position of the plurality of lenses, means the position of a zoom lens, contributing to zoom adjustment, of the plurality of lenses relative to the other lenses.

Further, at least one of the near-end-side and far-end-side limit positions of the variable range may be set to one of near-end-side and far-end-side focal positions. The following setting can be used.

For example, according to a first example, the near-end-side limit position is set to the near-end-side focal position, and the far-end-side limit position is set to the far-end-side focal position.

Furthermore, according to a second example, only the far-end-side limit position is set to the far-end-side focal position.

In addition, according to a third example, only the near-end-side limit position is set to the near-end-side focal position.

Further, the near-end-side focal position may be a focal position at the near end side of the shortest tele-end-side focal position and the shortest wide-end-side focal position, and the far-end-side focal position may be a focal position at the far end side of the longest tele-end-side focal position and the longest wide-end-side focal position. In the case of the first example, the following setting can be used.

For example, when the shortest tele-end-side focal position is closer to the near end than the shortest wide-end-side focal position and the longest wide-end-side focal position is closer to the far end than the longest tele-end-side focal position, the near-end-side limit position is set to the shortest tele-end-side focal position, and the far-end-side limit position is set to the longest wide-end-side focal position.

For example, when the shortest tele-end-side focal position is closer to the near end than the shortest wide-end-side focal position and the longest tele-end-side focal position is closer to the far end than the longest wide-end-side focal position, the near-end-side limit position is set to the shortest tele-end-side focal position, and the far-end-side limit position is set to the longest tele-end-side focal position.

For example, when the shortest wide-end-side focal position is closer to the near end than the shortest tele-end-side focal position and the longest wide-end-side focal position is closer to the far end than the longest tele-end-side focal position, the near-end-side limit position is set to the shortest wide-end-side focal position, and the far-end-side limit position is set to the longest wide-end-side focal position.

For example, when the shortest wide-end-side focal position is closer to the near end than the shortest tele-end-side focal position and the longest tele-end-side focal position is closer to the far end than the longest wide-end-side focal position, the near-end-side limit position is set to the shortest wide-end-side focal position, and the far-end-side limit position is set to the longest tele-end-side focal position.

This setting is similarly applied to the second and third examples.

However, when both the focus adjustment and the zoom adjustment are performed, the focal distance of the projection lens may be changed due to a variation in the contour of a projected image. That is, the zoom position changed by the zoom adjustment has an effect on the focus adjustment of the projection lens. Therefore, in the structure capable of performing both the focus adjustment and the zoom adjustment, when the variable range in the automatic adjustment control is set to be narrower than the mechanical limit range without considering the zoom position, the focal position is changed to the position where a projected image is not in the in-focus state at a predetermined distance, or it is hard to change the focal position to the position where a projected image is in the in-focus state at a predetermined distance, which makes it difficult to perform automatic adjustment control in an effective variable range.

In this aspect of the invention, for example, the near-end-side limit position is set to the focal position close to the near end, of the shortest tele-end-side focal position and the shortest wide-end-side focal position. Therefore, even when the zoom position is changed between the tele-end and the wide-end, it is possible to set the near-end-side limit position of the variable range in the automatic adjustment control to the near-end-side limit position of the entire effective variable range where a projected image should be in the in-focus state between the shortest projection distance and the longest projection distance which are defined in the specifications of the projection lens. In addition, for example, the far-end-side limit position is set to the focal position close to the far end, of the shortest wide-end-side focal position and the longest wide-end-side focal position, which makes it possible to set the far-end-side limit position of the variable range in the automatic adjustment control to the far-end-side limit position of the entire effective variable range. Therefore, the focal position is not changed to the position where a projected image is not in the in-focus state at a predetermined zoom position, or it is possible to change the focal position to the position where a projected image is in the in-focus state at a predetermined zoom position, which makes it difficult to shorten a focus adjustment time and to perform automatic adjustment control in an effective variable range.

In this aspect of the invention, preferably, the projector further includes a differential information storage unit which stores differential information related to a difference between at least one of a first focal position where the projected image is in the in-focus state when the zoom position is the tele-end-side zoom position and when the projection distance is a predetermined distance and a second focal position where the projected image is in the in-focus state when the zoom position is the wide-end-side zoom position and when the projection distance is the predetermined distance and at least one of the shortest tele-end-side focal position, the longest tele-end-side focal position, the shortest wide-end-side focal position, and the longest wide-end-side focal position; a focal position information acquiring unit which acquires focal position information related to the focal position at the predetermined distance; and a focal position calculating unit which calculates at least one of the near-end-side focal position and the far-end-side focal position, on the basis of the focal position information and the differential information.

In this structure, the following can be used as the differential information for calculating the near-end-side focal position.

For example, differential information related to a difference between the first focal position and the shortest tele-end-side focal position and to a difference between the second focal position and the shortest wide-end-side focal position is used.

For example, differential information related to a difference between the first focal position and the shortest wide-end-side focal position and to a difference between the second focal position and the shortest tele-end-side focal position is used.

For example, differential information related to differences between the first focal position and the shortest tele-end-side and wide-end-side focal positions or to differences between the second focal position and the shortest tele-end-side and wide-end-side focal positions is used.

Similarly, the following can be used as the differential information for calculating the far-end-side focal position.

For example, differential information related to a difference between the first focal position and the longest tele-end-side focal position and to a difference between the second focal position and the longest wide-end-side focal position is used.

Further, for example, differential information related to a difference between the first focal position and the longest wide-end-side focal position and to a difference between the second focal position and the longest tele-end-side focal position is used.

Furthermore, for example, differential information related to differences between the first focal position and the longest tele-end-side and wide-end-side focal positions or to differences between the second focal position and the longest tele-end-side and wide-end-side focal positions is used.

According to this aspect of the invention, since the projector includes the differential information storage unit, the focal position acquiring unit, and the focal position calculating unit, it can calculate the near-end-side focal position and the far-end-side focal position at one of the near-end-side and far-end-side limit positions of the variable range in the automatic adjustment control.

For example, the near-end-side focal position can be calculated as follows.

First, the focal position information acquiring unit acquires a predetermined-distance focal position of the first focal position and/or the second focal position.

Then, the focal position calculating unit adds a difference to the predetermined-distance focal position, on the basis of the differential information stored in the differential information storage unit, to calculate the shortest tele-end-side focal position and the shortest wide-end-side focal position. Subsequently, the focal position calculating unit sets one of the calculated shortest tele-end-side and wide-end-side focal positions, which is close to the near end, to the near-end-side limit position of the variable range in the automatic adjustment control.

Further, similarly, the focal position calculating unit adds a difference to the predetermined-distance focal position, on the basis of the differential information stored in the differential information storage unit, to calculate the longest tele-end-side focal position and the longest wide-end-side focal position. Subsequently, the focal position calculating unit sets one of the calculated longest tele-end-side and wide-end-side focal positions, which is close to the far end, to the far-end-side limit position of the variable range in the automatic adjustment control.

As described above, the projector calculates one of the near-end-side focal position and the far-end-side focal position according to a predetermined-distance focal position, and sets the calculated focal position to a limit position of the variable range in the automatic adjustment control. Therefore, this structure enables the operator to more easily manufacture a projector without any trouble, compared with a structure in which, when manufacturing a projector, the operator actually measures one of the near-end-side focal position and the far-end-side focal position or calculates it by arithmetic computation, and sets it to the limit position of the variable range in the automatic adjustment control. Thus, this structure makes it possible to improve convenience to the operator.

Further, in the above-mentioned structure, preferably, the projection lens includes a focus ring which supports at least one of the plurality of lenses and rotates on the optical axis of the plurality of lenses to change the focal position. The focal position changing unit rotates the focus ring to change the focal position. The projector further includes a rotational position detecting unit which detects a rotational position of the focus ring; and a range information storage unit which stores variable range information related to rotational positions of the focus ring corresponding to the near-end-side and far-end-side limit positions of the variable range in the automatic adjustment control. The focus adjustment control unit performs the automatic adjustment control within the variable range, on the basis of the rotational position of the focus ring detected by the rotational position detecting unit and the variable range information stored in the range information storage unit.

According to this structure, the focus adjustment control unit performs automatic adjustment control within the variable range on the basis of the rotatable position of the focus ring detected by the rotational position detecting unit and the variable range information stored in the range information storage unit. Therefore, the projector can has a simple structure and more easily perform automatic adjustment control, compared with a structure in which the relative position of a plurality of lenses (the positions of lenses in the direction of the optical axis) is detected to perform the automatic adjustment control.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to FIG. 1.

Structure of Projector

Figure 1:
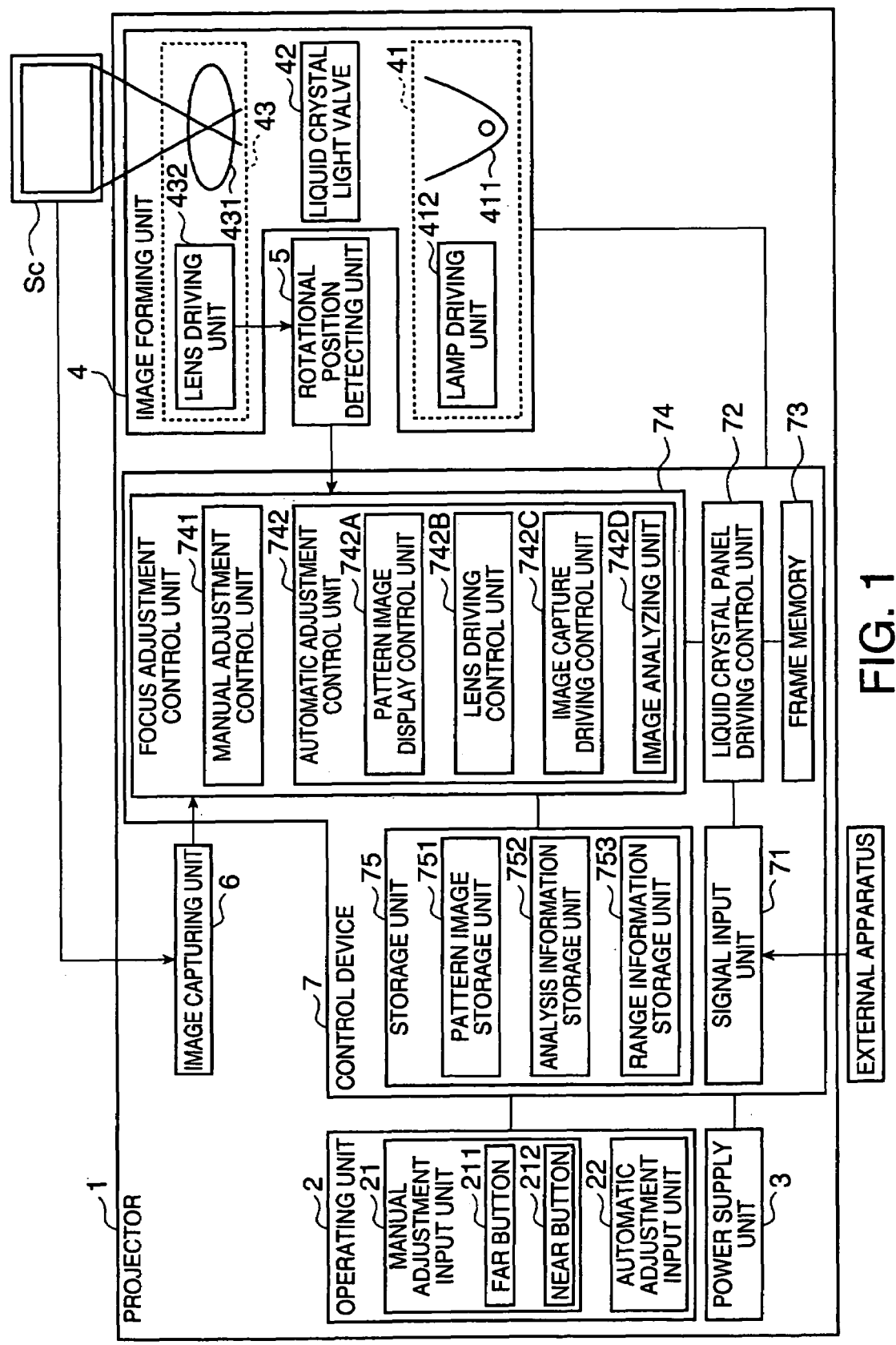
FIG. 1 is a block diagram illustrating the schematic structure of a projector according to a first embodiment.

FIG. 1 is a block diagram illustrating the schematic structure of a projector 1.

The projector 1 is an apparatus for modulating light beams emitted from a light source according to image information to form an optical image and for enlarging and projecting the formed optical image on a screen Sc (FIG. 1). As shown in FIG. 1, the projector 1 includes an operating unit 2, serving as a setting input unit, a power supply unit 3, an image forming unit 4, a rotational position detecting unit 5, an image capturing unit 6, and a control device 7.

The operating unit 2 is composed of a remote controller (not shown), or buttons or keys provided in the projector 1, and outputs a predetermined operating signal to the control device 7 when it is operated by a user. As shown in FIG. 1, the operating unit 2 includes a manual adjustment input unit 21 and an automatic adjustment input unit 22. However, in the operating unit 2, an input unit for turning ON or OFF the projector 1, an input unit for adjusting the volume thereof, and an input unit for adjusting the quality of a projected image are not shown in FIG. 1.

The manual adjustment input unit 21 is composed of input buttons for causing the control device 7 to perform manual control, which will be described later, in which focus adjustment is manually performed on an image projected on the screen Sc. As shown in FIG. 1, the manual adjustment input unit 21 includes a far button 211 and a near button 212. When the user pushes the far button 211 or the near button 212, the manual adjustment input unit 21 outputs operating signals, serving as manual adjustment information corresponding to pushing time, to the control device 7.

The automatic adjustment input unit 22 is an input button for causing the control device 7 to perform automatic control, which will be described later, in which the focus adjustment is automatically executed on an image projected on the screen Sc. The automatic adjustment input unit 22 outputs operating signals, serving as automatic control information, to the control device 7 when it is operated by the user.

The power supply unit 3 supplies power supplied from the outside to components of the projector 1. Although not shown in FIG. 1, the power supply unit 3 includes a main power supply for supplying power supplied from the outside to the components of the projector 1 and a sub-power supply for supplying the power supplied from the outside to, for example, the control device 7 of the projector 1 in a state in which the user operates the operating unit 2 to turn off the main power supply (in a standby state).

The image forming unit 4 forms an optical image, and enlarges and projects the optical image on the screen Sc under the control of the control device 7. As shown in FIG. 1, the image forming unit 4 includes, for example, a light source device 41, a liquid crystal light valve 42, serving as a light modulating device, and a projection optical device 43.

The light source device 41 radiates light beams to the liquid crystal light valve 42 under the control of the control device 7. The light source device 41 includes a light source lamp 411 and a lamp driving unit 412.

The light source lamp 411 is composed of an extra-high pressure mercury lamp, but is not limited thereto. For example, the light source lamp 411 may be composed of a discharge-emission-type light source lamp, such as a metal halide lamp or a xenon lamp. In addition, the light source lamp 411 is not limited to the discharge-emission-type light source lamp. For example, it may be composed of various self-emitting elements, such as a light emitting diode, an organic EL element, and a silicon light emitting element.

The lamp driving unit 412 generates driving signals, according to a predetermined driving frequency, to drive the light source lamp 411 under the control of the control device 7.

The liquid crystal light valve 42 is a transmissive liquid crystal panel. The liquid crystal light valve 42 changes the arrangement of liquid crystal molecules contained in a liquid crystal cell (not shown), on the basis of the driving signals from the control device 7, to transmit or shield light beams emitted from the light source device 41, thereby emitting an optical image corresponding to image information to the projection optical device 43.

The projection optical device 43 enlarges and projects the optical image emitted from the liquid crystal light valve 42 onto the screen Sc. The projection optical device 43 includes a projection lens 431 and a lens driving unit 432 serving as a focal position changing unit.

Figure 2:
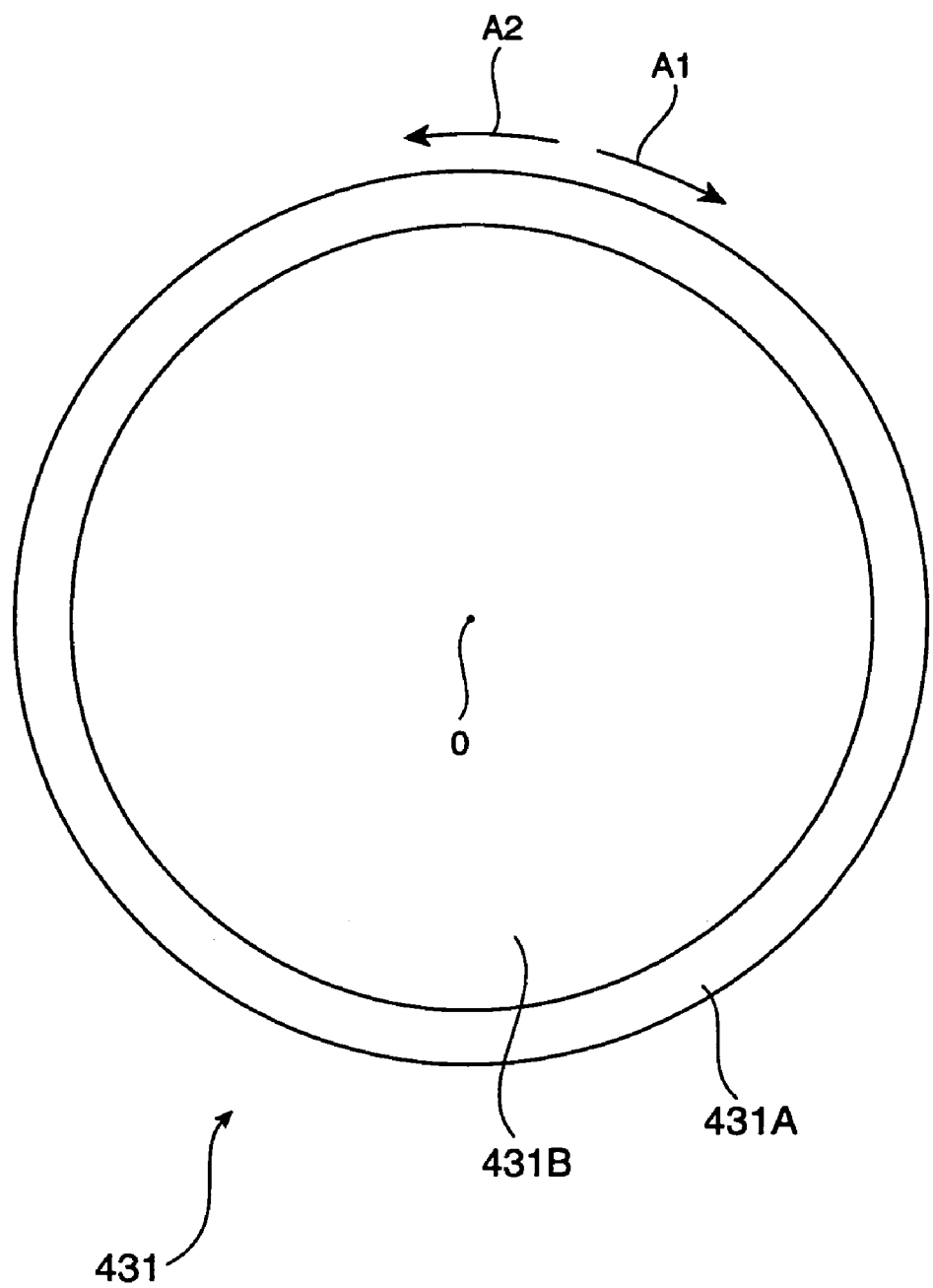
FIG. 2 is a diagram schematically illustrating main parts of a projection lens according to the first embodiment.

FIG. 2 is a diagram schematically illustrating a main part of the projection lens 431. More specifically, FIG. 2 is a diagram illustrating the main part of the projection lens 431 as viewed from the direction of the optical axis thereof.

The projection lens 431 is composed of a lens assembly in which a plurality of lenses is provided in a cylindrical lens-barrel. Therefore, the projection lens 431 enlarges and projects the optical image emitted from the liquid crystal light valve 42 onto the screen Sc by means of the plurality of lenses.

The lens-barrel is formed by connecting a plurality of members, and the plurality of members support the plurality of lenses.

As shown in FIG. 2, among the plurality of members constituting the lens-barrel, a focus ring 431A supports a focus lens 431B, contributing to the focus adjustment of a projected image, of the plurality of lenses. The focus lens 431B may be composed of a single lens or a group of lenses. The focus ring 431A is formed so as to rotate on an optical axis O of the focus lens 431B with respect to the other members. The rotation of the focus ring 431A causes the focus lens 431B to move in the direction of the optical axis with respect to the other lenses, so that the position of the focus lens 431B with respect to the other lenses (hereinafter, referred to as a focal position), which is the relative position of the plurality of lenses, is changed. In this way, the focus adjustment of a projected image is performed. That is, the rotation angle of the focus ring 431A corresponds to the focal position.

More specifically, as shown in FIG. 2, when the focus ring 431A is rotated in the direction of arrow A1, the focal position shifts to a near end where a projected image can be adjusted to an in-focus state when a projection distance is short. On the other hand, when the focus ring 431A is rotated in the direction of arrow A2, the focal position shifts to a far end where a projected image can be adjusted to an in-focus state when a projection distance is long.

The lens driving unit 432 is formed of, for example, a pulse motor, and rotates the focus ring 431A of the projection lens 431 to move the focus lens 431B relative to the other lenses, under the control of the control device 7, thereby changing the focal position.

Further, the focus ring 431A may be formed such that it can be rotated not only by hand but also by the lens driving unit 432.

Although not shown in the drawings, the projector 1 includes three liquid crystal light valves 42 corresponding to three colors R, G, and B. In addition, the light source device 41 has a colored-light-separating optical system for separating light emitted from the light source into three-color light components. The projection optical device 43 includes a synthesizing optical system for synthesizing three colored light images to create an optical image representing a color image. These optical systems can be formed of various optical systems used for general projectors.

The rotational position detecting unit 5 is formed of, for example, a rotary encoder provided at a motor shaft of the lens driving unit 432. The rotational position detecting unit 5 recognizes the rotational position of the focus ring 431A of the projection lens 431 and detects the rotation angle of the focus ring 431A from an initial position thereof, which will be described later. Then, the rotational position detecting unit 5 outputs signals to the control device 7 on the basis of the detected rotation angle. As described above, since the rotation angle of the focus ring 431A corresponds to the focal position, the control device 7 recognizes the focal position by the detection of the rotation angle of the focus ring 431A from the initial position by the rotational position detecting unit 5.

Further, when the rotational position detecting unit 5 is formed so as to detect the rotational position of the focus ring 431A of the projection lens 431, the rotary encoder may be provided at portions other than the motor shaft of the lens driving unit 432, or it may be formed of members other than the rotary encoder.

The image capturing unit 6 captures an image (an adjustment pattern image, which will be described later) enlarged and projected on the screen Sc under the control of the control device 7. The image capturing unit 6 is composed of, for example, a CCD camera equipped with an area sensor having a CCD (charge coupled device) as an image capturing element. The image capturing unit 6 captures the adjustment pattern image and outputs electric signals corresponding to the captured adjustment pattern image to the control unit 7.

The control device 7 controls, for example, the power supply unit 3, the image forming unit 4, the rotational position detecting unit 5, and the image capturing unit 6. The control device 7 controls the image forming unit 4 to enlarge and project an image corresponding to image signals input from an external apparatus, and performs focus adjustment on the image projected on the screen Sc in response to the operating signals input from the operating unit 2. The focus adjustment control of the projected image by the control device 7 will be mainly described below. However, a description of the other control structures will be omitted, and thus the drawings related to the description are not shown below.

As shown in FIG. 1, the control device 7 includes a signal input unit 71, a liquid crystal panel driving control unit 72, a frame memory 73, a focus adjustment control unit 74, and a storage unit 75.

The signal input unit 71 receives image signals output from various external apparatuses and converts them into image signals which can be processed by the liquid crystal panel driving control unit 72 to output the converted image signals to liquid crystal panel driving control unit 72. Then, the image signals (digital image signals) output from the signal input unit 71 are temporally stored in the frame memory 73.

The liquid crystal panel driving control unit 72 appropriately reads out the digital image signals which have been output from the signal input unit 71 and then sequentially stored in the frame memory 73, and performs a predetermined process on the read digital image signals. Then, the liquid crystal panel driving control unit 72 outputs image information corresponding to the processed image to the liquid crystal light valve 42 as driving signals, thereby forming a predetermined optical image. The predetermined process performed by the liquid crystal panel driving control unit 72 includes, for example, an image size adjusting process for increasing or decreasing the size of an image, a trapezoidal distortion correcting process, a display quality adjusting process, and a gamma correction process. Since these processes are well-known techniques, a detailed description thereof will be omitted.

The focus adjustment control unit 74 drives the lens driving unit 432 of the projection optical device 43, in response to the operating signals input from the manual adjustment input unit 21 or the automatic adjustment input unit 22 which constitutes the operating unit 2, to perform focus adjustment on the image projected on the screen Sc. As shown in FIG. 1, the focus adjustment control unit 74 includes a manual adjustment control unit 741 and an automatic adjustment control unit 742.

The manual adjustment control unit 741 performs manual adjustment control of outputting, to the lens driving unit 432, a predetermined control signal corresponding to the input operation (the time for which the button is maintained in a pushed state) of the manual adjustment input unit 21, constituting the operating unit 2, by the user to drive the lens driving unit 432, and of rotating the focus ring 431A by an angle corresponding to the time for which the manual adjustment input unit 21 is maintained in the pushed state to change the focal position.

The automatic adjustment control unit 742 performs automatic adjustment control of driving the lens driving unit 432 until a projected image is in an in-focus state in response to the input operation of the automatic adjustment input unit 22, constituting the operating unit 2, by the user to rotate the focus ring 431A, thereby changing the focal position. The automatic adjustment control unit 742 includes a pattern image display control unit 742A, a lens driving control unit 742B, an image capture driving control unit 742C, and an image analyzing unit 742D.

The pattern image display control unit 742A outputs a predetermined control instruction to the liquid crystal panel driving control unit 72, in response to the operating signal output from the automatic adjustment input unit 22 by the operation of the user, to form an adjustment pattern image on the liquid crystal light valve 42 on the basis of pattern image information, which will be described later, stored in the storage unit 75.

The lens driving control unit 742B drives the lens driving unit 432 to rotate the focus ring 431A by a predetermined angle (to shift the focal position by a predetermined distance in the direction of the optical axis). Whenever driving the lens driving unit 432 to rotate the focus ring 431A by a predetermined angle, the lens driving control unit 742B outputs a predetermined signal to the image capture driving control unit 742C.

Further, the lens driving control unit 742B rotates the focus ring 431A in the rotatable range, serving as a predetermined variable range, on the basis of the rotation angle of the focus ring 431A corresponding to the signal output from the rotational position detecting unit 5 and variable range information stored in the storage unit 75, which will be described later.

The image capture driving control unit 742C drives the image capturing unit 6 to capture the adjustment pattern image projected on the screen Sc, in response to the signals output from the lens driving control unit 742B.

The image analyzing unit 742D determines an in-focus position (rotation angle) of the focus ring 431A where a projected image is in an in-focus state, on the basis of the rotation angle of the focus ring 431A corresponding to the signals sequentially output from the rotational position detecting unit 5 and the adjustment pattern image corresponding to the signals sequentially output from the image capturing unit 6. The image analyzing unit 742D outputs a signal corresponding to the determined in-focus position to the lens driving control unit 742B.

As shown in FIG. 1, the storage unit 75 includes a pattern image storage unit 751 an analysis information storage unit 752, and a range information storage unit 753.

The pattern image storage unit 751 stores pattern image information related to the adjustment pattern image required for the automatic adjustment control unit 742 to perform the automatic adjustment control.

Figure 3:
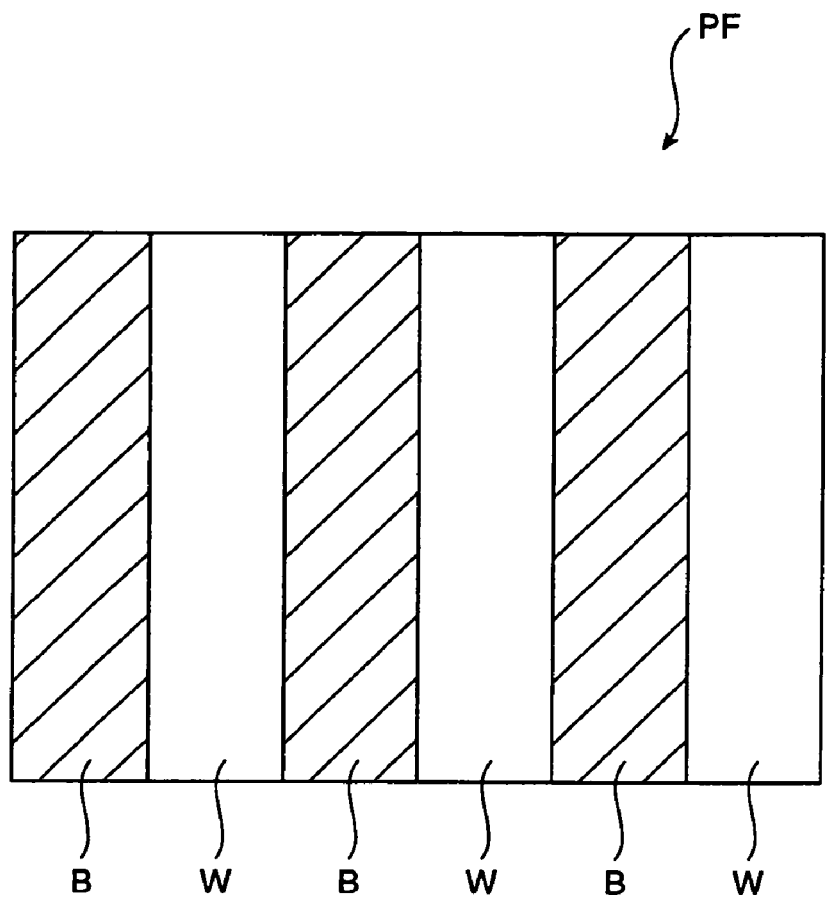
FIG. 3 is a diagram illustrating an example of an adjustment pattern image according to the first embodiment.

FIG. 3 is a diagram illustrating an example of an adjustment pattern image PF.

As shown in FIG. 3, the adjustment pattern image PF is a stripe-shaped image in which white vertical lines W and black vertical lines B are alternately arranged.

Adjustment pattern images other than the adjustment pattern image PF shown in FIG. 3 can be used. For example, a stripe-shaped image in which while lines and black lines are alternately arranged in the horizontal direction may be used as the adjustment pattern image.

The analysis information storage unit 752 sequentially stores information items output from the image analyzing unit 742D.

The range information storage unit 753 stores variable range information related to the rotatable range required for the automatic adjustment control unit 742 to perform the automatic adjustment control.

In this embodiment, a near-end-side limit position of the rotatable range in the automatic adjustment control is set as follows. In the following description, it is assumed that the shortest projection distance of the projection lens 431 is 1.5 m and the longest projection distance thereof is 10 m.

First, before manufacturing the projector 1, the operator arranges the screen Sc at a distance of 1.5 m or 10 m from a projector equipped with a reference projection lens (master lens) having standard optical characteristics, and operates the projector to display an adjustment pattern image on the screen Sc. Then, the operator rotates a focus ring constituting the reference projection lens to perform focus adjustment such that the adjustment pattern image is in an in-focus state, and then measures the rotation angles (a near-end-side design limit position and a far-end-side design limit position) of the focus ring where the adjustment pattern image is in the in-focus state at the shortest projection distance (1.5 m) and the longest projection distance (10 m). The operator sets a position deviating from the near-end-side design limit position by a predetermined angle as a near-end-side limit position (initial position) of the rotatable range in the automatic adjustment control, considering manufacturing errors of the projection lens 431 or the margin of focus adjustment, when manufacturing the projector 1. Then, the operator stores information related to the initial position (the rotation angle of the focus ring 431A) in the range information storage unit 753 as variable range information.

The far-end-side limit position of the rotatable range in the automatic adjustment control is set as follows.

For example, when manufacturing the projector 1, the operator arranges the screen Sc at a distance of 10 m from the projector 1, and operates the projector 1 to display an adjustment pattern image on the screen Sc. Then, the operator rotates the focus ring 431A constituting the projection lens 431 to perform focus adjustment such that the adjustment pattern image is in an in-focus state, and then measures the rotation angle (a measured far-end-side limit position) of the focus ring 431A where the adjustment pattern image is in the in-focus state. The operator determines the measured far-end-side limit position as the far-end-side limit position of the rotatable range in the automatic adjustment control, and stores information related to the measured far-end-side limit position (the rotation angle of the focus ring 431A) in the range information storage unit 753 as variable range information.

Further, for example, when manufacturing the projector 1, the operator arranges the screen Sc at a distance of 1.5 m from the projector 1, and operates the projector 1 to display an adjustment pattern image on the screen Sc. Then, the operator rotates the focus ring 431A constituting the projection lens 431 to perform focus adjustment such that the adjustment pattern image is in the in-focus state, and then measures the rotation angle (a measured near-end-side limit position) of the focus ring 431A where the adjustment pattern image is in the in-focus state. The operator determines a rotation angle obtained by adding a predetermined angle to the measured near-end-side limit position (the rotation angle of the focus ring 431A) as the far-end-side limit position of the rotatable range in the automatic adjustment control, and stores information related to the limit position (the rotation angle of the focus ring 431A) in the range information storage unit 753 as variable range information.

Focus Adjustment Control of Projector

Next, the focus adjustment control of the projector 1 will be described.

Manual adjustment control by the manual adjustment control unit 741 and automatic adjustment control by the automatic adjustment control unit 742 will be sequentially described below.

Manual Adjustment Control

Figure 4:
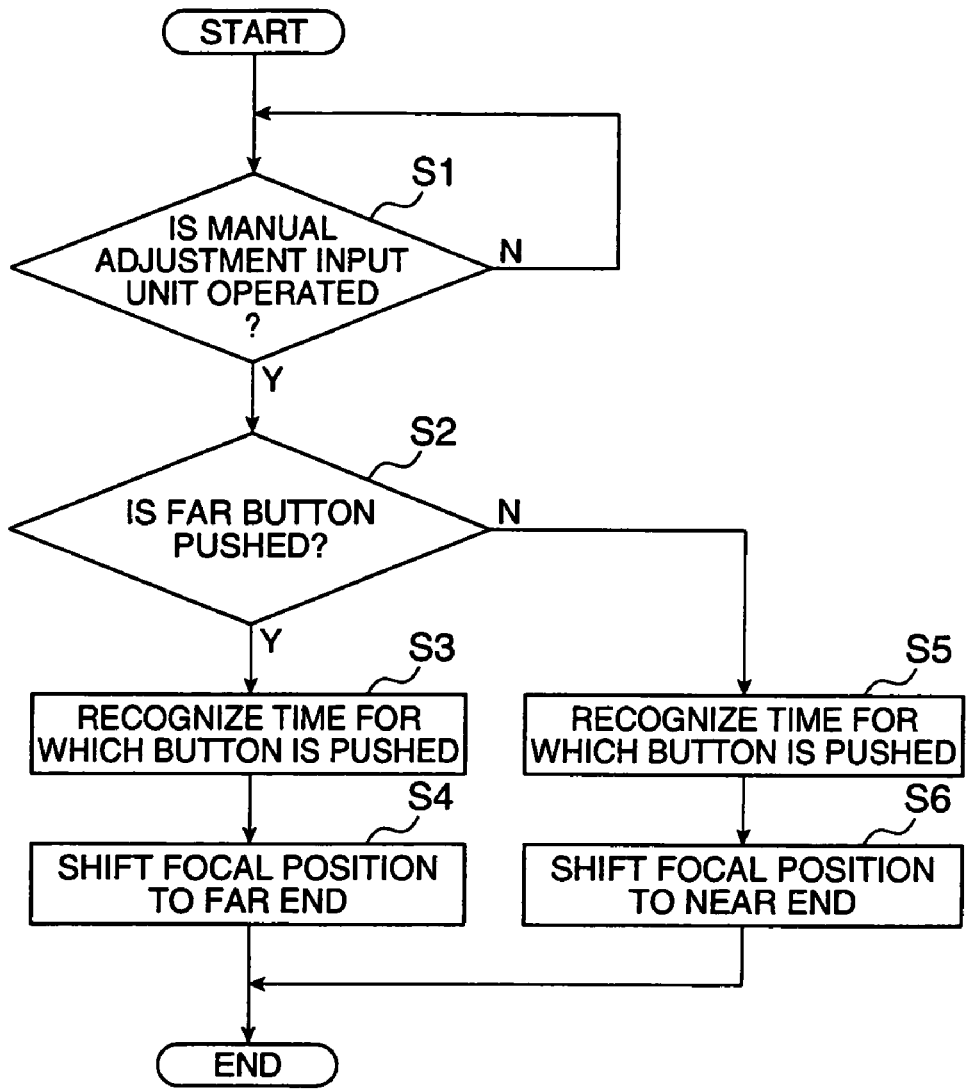
FIG. 4 is a flow chart illustrating manual adjustment control performed by a manual adjustment control unit according to the first embodiment.

FIG. 4 is a flow chart illustrating the manual adjustment control by the manual adjustment control unit 741.

Figure 5:
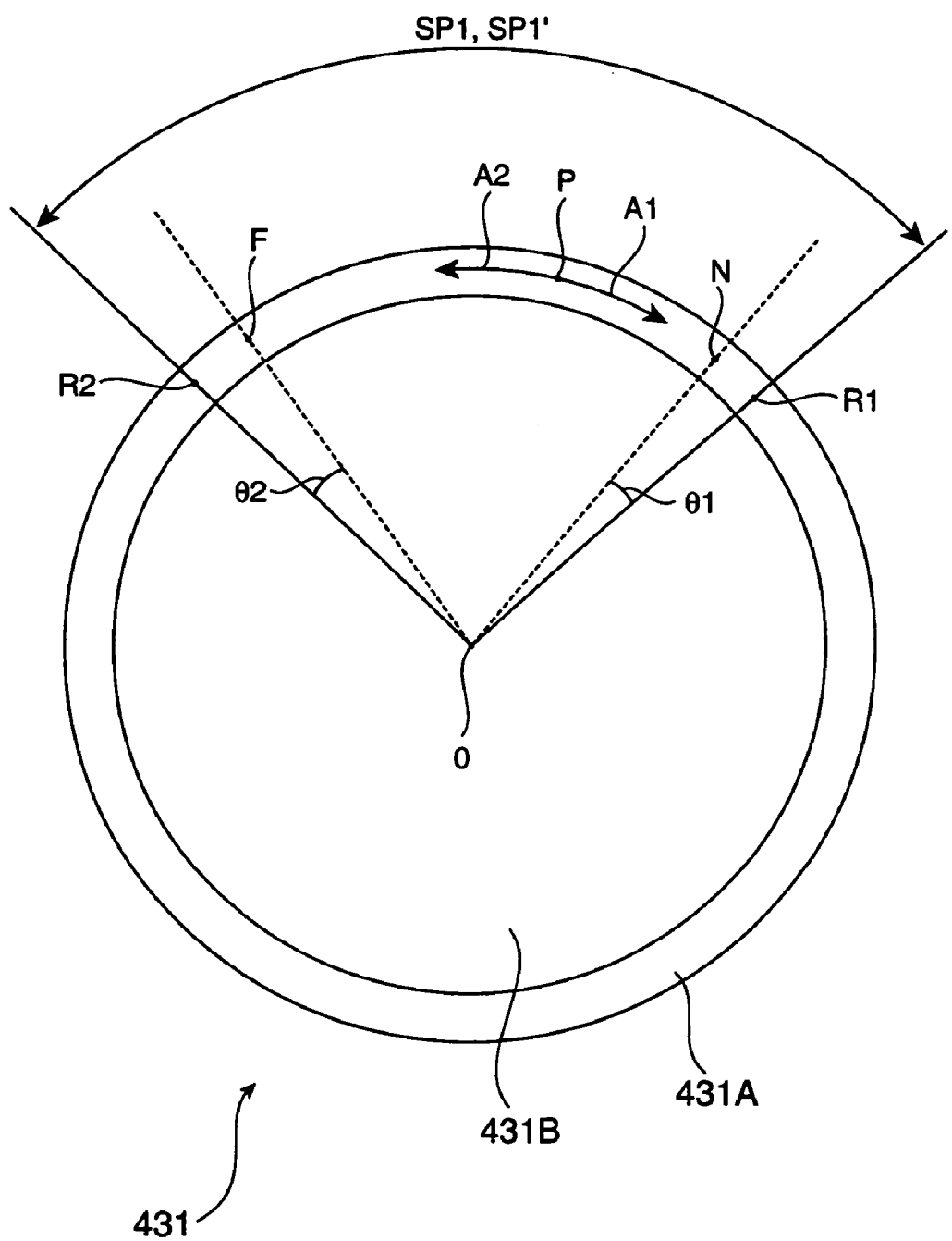
FIG. 5 is a diagram schematically illustrating a rotatable range of a focus ring in the manual adjustment control according to the first embodiment.

FIG. 5 is a diagram schematically illustrating the rotatable range of the focus ring 431A in the manual adjustment control. More specifically, FIG. 5 is a diagram illustrating a main part of the projection lens 431 as viewed from the direction of the optical axis thereof, similar to FIG. 2.

First, the manual adjustment control unit 741 always monitors whether the operating signals are input from the manual adjustment input unit 21, that is, whether the manual adjustment input unit 21 is operated by the user (step S1).

In step S1, when it is determined that the manual adjustment input unit 21 is operated by the user (in case of 'Y'), the manual adjustment control unit 741 determines whether the far button 211 is pushed (step S2).

In step S2, when it is determined that the far button 211 is pushed (in case of 'Y'), the manual adjustment control unit 741 recognizes a duration time for which the far button 211 is maintained in a pushed state, on the basis of the operating signal output from the far button 211 (step S3).

After step S3, the manual adjustment control unit 741 outputs a control signal corresponding to the recognized duration time to the lens driving unit 432, and drives the lens driving unit 432 such that the focus ring 431A rotates in the direction of arrow A2 (FIG. 5) by an angle corresponding to the duration time for which the far button 211 is pushed, thereby shifting the focal position to the far end where a projected image can be adjusted to the in-focus state when the projection distance is long (step S4).

Meanwhile, in step S2, when it is determined that the near button 212 is pushed (in case of 'N'), the manual adjustment control unit 741 recognizes a duration time for which the near button 212 is maintained in a pushed state, on the basis of the operating signal output from the near button 212 (step S5).

After step S5, the manual adjustment control unit 741 outputs a control signal corresponding to the recognized duration time to the lens driving unit 432, and drives the lens driving unit 432 such that the focus ring 431A rotates in the direction of arrow A1 (FIG. 5) by an angle corresponding to the duration time for which the near button 212 is pushed, thereby shifting the focal position to the near end where a projected image can be adjusted to the in-focus state when the projection distance is short (step S6).

The user pushes the far button 211 or the near button, 212 while seeing the image projected on the screen Sc with eyes, to cause the manual adjustment control unit 741 to perform manual adjustment control such that the projected image is in the in-focus state.

In this way, in the manual adjustment control, the focus ring 431A can be changed from a predetermined position P to a manual near-end-side limit position R1 or a manual far-end-side limit position R2, as shown in FIG. 5. That is, the rotatable range of the focus ring 431A in the manual adjustment control is set between the manual near-end-side limit position R1 and the manual far-end-side limit position R2.

As shown in FIG. 5, the manual near-end-side limit position R1 is set at a position deviating from the near-end-side design limit position N by a predetermined angle $\theta 1$ in the direction of arrow A1.

Similarly, as shown in FIG. 5, the manual far-end-side limit position R2 is set at a position deviating from the far-end-side design limit position F by a predetermined angle $\theta 2$ in the direction of arrow A2.

Further, as shown in FIG. 5, a rotatable range SP1 of the focus ring 431A in the manual adjustment control, which is the variable range of the focus ring 431A, is set within a range wider than the range from the near-end-side design limit position N to the far-end-side design limit position F. Even when the in-focus position differs from the design position due to, for example, manufacturing errors of the projection lens 431, the setting of the rotatable range makes it possible to perform focus adjustment at the in-focus position by the manual adjustment control.

In this embodiment, the rotatable range SP1 of the focus ring 431A in the manual adjustment control is set to be equal to a mechanical limit range SP1', which is a variable range where the focus ring 431A can be mechanically rotated. That is, the rotatable range SP1 of the focus ring 431A in the manual adjustment control is set in the entire range where the focus ring 431A can be mechanically rotated.

Automatic Adjustment Control

Figure 6:
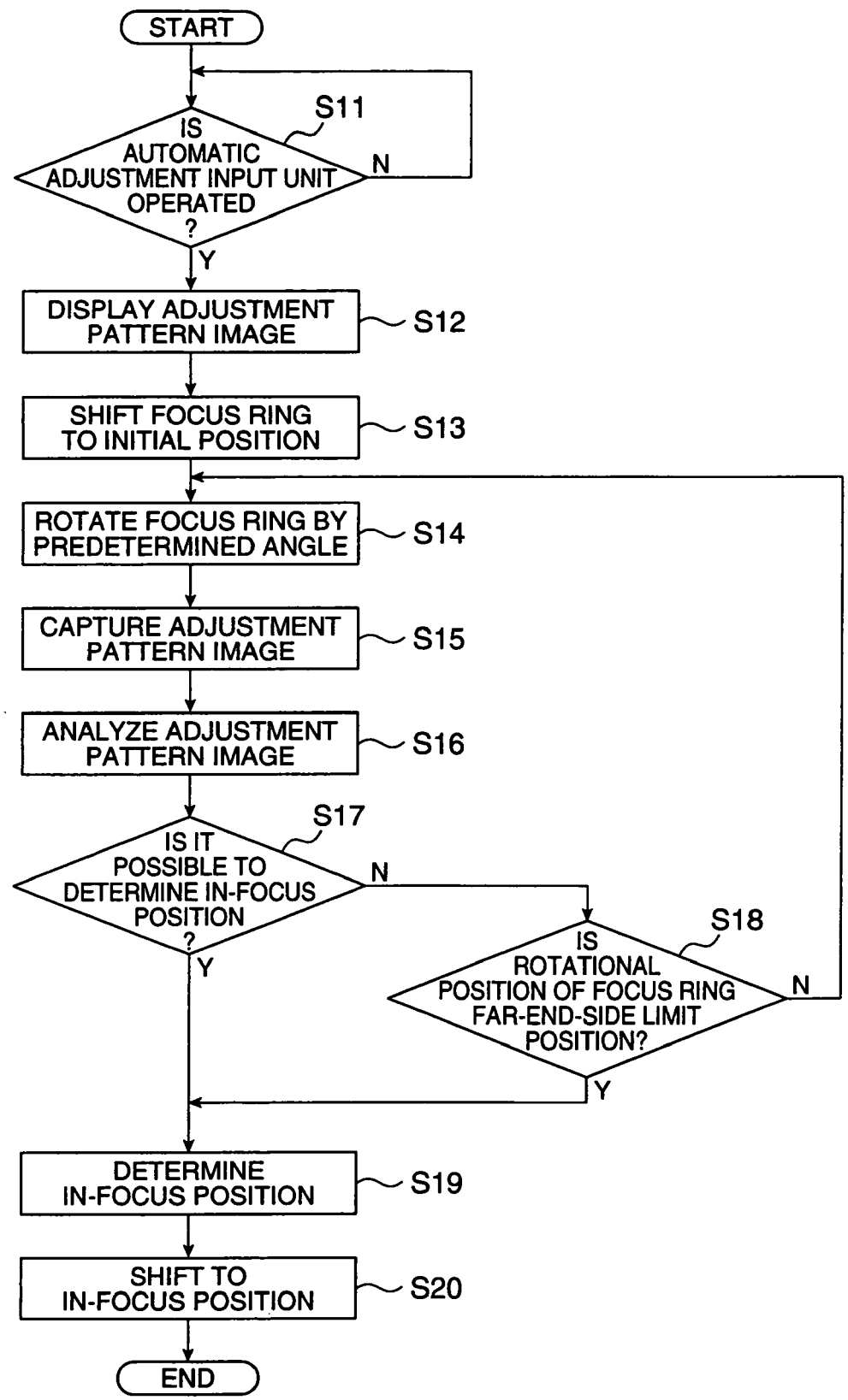
FIG. 6 is a flow chart illustrating automatic adjustment control performed by an automatic adjustment control unit according to the first embodiment.

FIG. 6 is a flow chart illustrating the automatic adjustment control by the automatic adjustment control unit 742.

Figure 7:
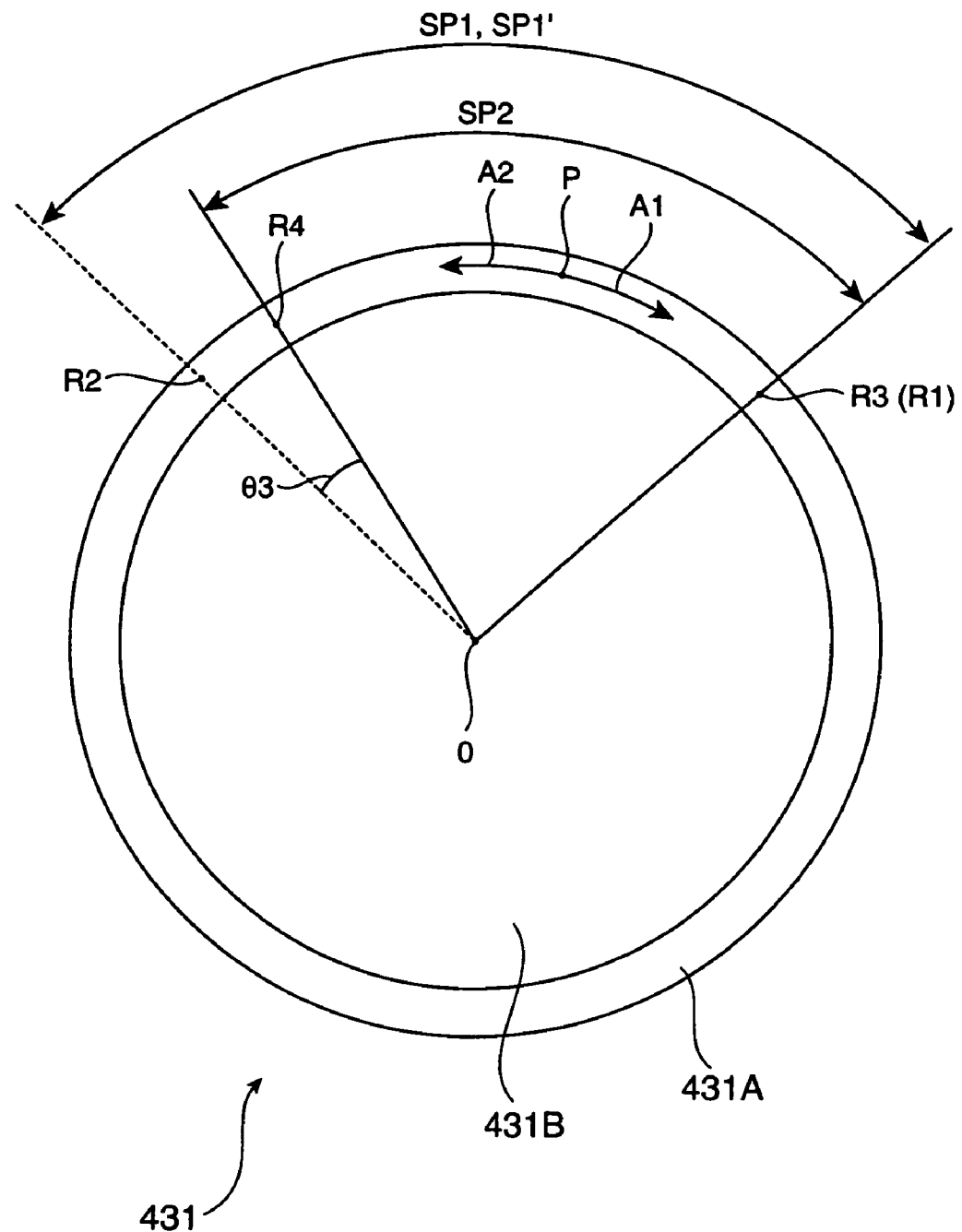
FIG. 7 is a diagram schematically illustrating the rotatable range of the focus ring in the automatic adjustment control according to the first embodiment.

FIG. 7 is a diagram schematically illustrating the rotatable range of the focus ring 431A in the automatic adjustment control. More specifically, FIG. 7 is a diagram as viewing a main part of the projection lens 431 in the direction of the optical axis, similar to FIGS. 2 and 5.

First, the automatic adjustment control unit 742 always monitors whether the operating signals are input from the automatic adjustment input unit 22, that is, whether the automatic adjustment input unit 22 is operated by the user (step S11).

In step S11, when the automatic adjustment control unit 742 determines that the automatic adjustment input unit 22 is operated by the user (in case of 'Y'), the pattern image display control unit 742A outputs a predetermined control instruction to the liquid crystal panel driving control unit 72. Subsequently, the liquid crystal panel driving control unit 72 reads out the pattern image information stored in the pattern image storage unit 751 and forms an adjustment pattern image on the liquid crystal light valve 42, on the basis of the pattern image information. Then, the adjustment pattern image formed by means of the projection lens 431 is enlarged and projected onto the screen Sc (step S12).

After step S12, The lens driving control unit 742B reads out the variable range information stored in the range information storage unit 753. Then, the lens driving control unit 742B drives the lens driving unit 432 to change the focal position to the initial position, on the basis of the variable range information (step S13).

More specifically, as shown in FIG. 7, the lens driving control unit 742B drives the lens driving unit 432 such that the predetermined position P of the focus ring 431A is located at an initial position R3. In this embodiment, as shown in FIG. 7, the initial position R3 is set at the same position as the manual near-end-side limit position R1.

After step S13, the lens driving control unit 742B drives the lens driving unit 432 to rotate the focus ring 431A by a predetermined angle in the direction of arrow A2 (FIG. 7) (step S14). Then, the lens driving control unit 742B outputs a predetermined signal to the image capture driving control unit 742C.

After step S14, the image capture driving control unit 742C drives the image capturing unit 6 to capture the adjustment pattern image projected onto the screen Sc, in response to the signal output from the lens driving control unit 742B (step S15).

After step S15, the image analyzing unit 742D recognizes the captured adjustment pattern image and analyzes the adjustment pattern image, on the basis of the signal output from the image capturing unit 6 (step S16).

For example, the image analyzing unit 742D analyzes the adjustment pattern image as follows.

First, the image analyzing unit 742D measures brightness values of the white line W and the black line B of the adjustment pattern image PF shown in FIG. 3. Then, the image analyzing unit 742D calculates the contrast value of the adjustment pattern image PF on the basis of a difference between the brightness values of the white line W and the black line B.

Then, the image analyzing unit 742D stores, in the analysis information storage unit 752, analysis information obtained by associating the calculated contrast value and the rotation angle of the focus ring 431A based on the signal output from the rotational position detecting unit 5.

In this structure, a method of analyzing the adjustment pattern image by the image analyzing unit 742D is not limited to the above, but other methods may be used.

After step S16, the image analyzing unit 742D reads out the analysis information stored in the analysis information storage unit 752 and determines whether to determine the in-focus position of the adjustment pattern image (step S17).

More specifically, in step S17, the image analyzing unit 742D recognizes the relationship between the rotation angle of the focus ring 431A and the calculated contrast value, on the basis of the analysis information stored in the analysis information storage unit 752, and determines whether a peak where the contact value is the maximum value is created.

In step S17, when the image analyzing unit 742D determines that it is difficult to determine the in-focus position of the adjustment pattern image (in case of 'N'), the image analyzing unit 742D outputs a predetermined control signal to the lens driving control unit 742B.

Then, the lens driving control unit 742B compares the rotation angle of the focus ring 431A based on the signal output from the rotational position detecting unit 5 and the far-end-side limit position (rotation angle) based on the variable range information stored in the range information storage unit 753 and determines whether the rotation angles are equal to each other (step S18). That is, the lens driving control unit 742B compares the current rotation angle of the focus ring 431A detected by the rotational position detecting unit 5 and the far-end-side limit position based on the variable range information to repeatedly perform step S14, and determines whether the predetermined position P of the focus ring 431A reaches the initial position R3 or the far-end-side limit position R4 (FIG. 7) in the automatic adjustment control, as shown in FIG. 7.

In step S18, when it is determined that the predetermined position P does not reach the far-end-side limit position R4 (in case of 'N'), the automatic adjustment control unit 742 repeatedly perform steps S14 to S16 until the in-focus position can be determined in step S17, or until the predetermined position P reaches the far-end-side limit position R4.

When the image analyzing unit 742D determines that the in-focus position of the adjustment pattern image can be determined in step S17, or when the lens driving control unit 742B determines that the predetermined position P reaches the far-end-side limit position R4 by repeated execution of steps S14 to S16, the image analyzing unit 742D determines the in-focus position of the adjustment pattern image (step S19).

More specifically, when it is determined that the in-focus position can be determined in step S17, the image analyzing unit 742D determines, as the in-focus position, the rotation angle of the focus ring 431A corresponding to a peak position where the contrast value is the maximum, from the relationship between the rotation angle of the focus ring 431A and the contrast value.

Further, when it is determined that the in-focus position is not determined in step S17 and thus it is determined that the predetermined position P reaches the far-end-side limit potion R4 in step S18, the image analyzing unit 742D determines the far-end-side limit position R4 as the in-focus position.

Then, the image analyzing unit 742D outputs a signal corresponding to the determined in-focus position to the lens driving control unit 742B.

After step S19, on the basis of the signal output from the image analyzing unit 742D, the lens driving control unit 742B recognizes the in-focus position and drives the lens driving control 432 to rotate the focus ring 431A such that the rotation position of the focus ring 431A is the in-focus position, thereby shifting the focal position to a position where a projected image is in the in-focus state (step S20).

As described above, the rotatable range of the focus ring 431A in the automatic adjustment control is set in the range from the initial position R3 to the far-end-side limit position R4.

As shown in FIG. 7, the far-end-side limit position R4 is set so as to deviate from the manual far-end-side limit position R2 by a predetermined angle θ3 in the direction of arrow A1. The rotatable range SP2, serving as the variable range of the focus ring 431A in the automatic adjustment control, is narrower than, especially the far-end side of which is narrower than, the rotatable range SP1 of the focus ring 431A in the manual adjustment control, as shown in FIG. 7.

As described above, in the first embodiment, a mechanical limit range SP1' where the focus ring 431A can rotate mechanically is set to be wider than the design range from the near-end-side design limit position N to the far-end-side design limit position F. In addition, in the automatic adjustment control by the automatic adjustment control unit 742, the rotatable range SP2 of the focus ring 431A is set to be narrower than the mechanical limit range SP1'. Therefore, in the automatic adjustment control, the rotation range of the focus ring 431A when determining the in-focus position becomes narrow, which makes it possible to rapidly determine the in-focus position and thus to shorten a focus adjustment time.

In this case, the rotatable range SP1 of the focus ring 431A in the manual adjustment control by the manual adjustment control unit 741 is set to be equal to the mechanical limit range SP1'. Therefore, the focus adjustment range which is not controlled by the automatic adjustment control can be controlled by the manual adjustment control, which makes it possible to shorten the focus adjustment time in the automatic adjustment control and to ensure a wide focus adjustment range in the manual adjustment control, resulting in an improvement in the convenience of the user.

When focus adjustment is performed on a projected image at the far end side where the projected image can be in the in-focus state if the projection distance to the screen Sc is long, generally, a variation in the projected image (displacement in focus) with respect to the rotation of the focus ring 431A (the change of the focal position) becomes small. Therefore, in the automatic adjustment control, when the focus adjustment is performed in a state in which the focal position is changed from a predetermined position to the far end side, it takes a long time to determine the in-focus position. In addition, when the focal position is changed from the predetermined position to the far end side, the variation in the projected image (displacement in focus) is so small that the user cannot recognize it with eyes. Thus, in the automatic adjustment control, when the focus adjustment is performed in the state in which the focal position is changed from the predetermined position to the far end side, it is a mere waste of time to determine the in-focus position.

In contrast, in this embodiment, the rotatable range SP2 in the automatic adjustment control is set to be narrower than the mechanical limit range SP1' (the rotatable range SP1 in the manual adjustment control) at the far end side. Therefore, it is possible to stop focus adjustment at the far-end-side limit position R4 which has a narrow range when the focus adjustment is performed under the automatic adjustment control, which makes it possible to effectively shorten the focus adjustment time without wasting time to determine the in-focus position.

In this embodiment, in a case in which the far-end-side limit position R4 of the rotatable range SP2 in the automatic adjustment control is set to a measured far-end-side limit position, for example, in the automatic adjustment control, even when the predetermined position P of the focus ring 431A reaches the far-end-side limit position R4 (step S18) and thus the far-end-side limit position R4 is determined as the in-focus position (step S19), it is possible to define a proper in-focus position and thus to properly perform focus adjustment control because the far-end-side limit position R4 is set to the measured far-end-side limit position that has been measured actually.

Further, when the far-end-side limit position R4 of the rotatable range SP2 in the automatic adjustment control is set to a position deviating from a measured near-end-side limit position by a predetermined angle, the far-end-side limit position R4 can be set in a state in which the distance between the screen Sc and the projector 1 is small (the minimum projection distance between the screen Sc and the projector 1). Therefore, a small space is needed to set the far-end-side limit position R4, which makes it possible to easily set the far-end-side limit position R4 in the manufacturing place of the projector 1.

The automatic adjustment control unit 742 performs automatic adjustment control within the rotatable range of the focus ring 431A, on the basis of the rotational position of the focus ring 431A detected by the rotational position detecting unit 5 and the variable range information stored in the range information storage unit 753. Therefore, this structure makes it possible to simplify the configuration of a member for detecting the position of the focus lens 431B and to easily perform automatic adjustment control, compared with a structure in which the moving position of the focus lens 431B is detected to perform automatic adjustment control.

Second Embodiment

Next, a second embodiment of the invention will be described with reference to the drawings.

In the second embodiment, the same components as those in the first embodiment have the same reference numerals, and thus a detailed description thereof will be omitted or simply made.

In the first embodiment, the projector 1 performs both focus adjustment and zoom adjustment for adjusting the outline of a projected image. That is, the rotatable range SP2 in the automatic adjustment control is set, not considering a zoom position which is changed to perform the zoom adjustment of a projected image.

In contrast, in the second embodiment, the projection lens 431 includes a zoom lens 431D contributing to the zoom adjustment of a projected image and a zoom ring 431C for supporting the zoom lens 431D in addition to the focus ring 431A and the focus lens 431B. Further, in the second embodiment, the rotatable range SP2 in the automatic adjustment control is set considering the zoom position. That is, the second embodiment is similar to the first embodiment except for the structure of the projection lens 431 and information stored in the range information storage unit 753.

Figure 8:
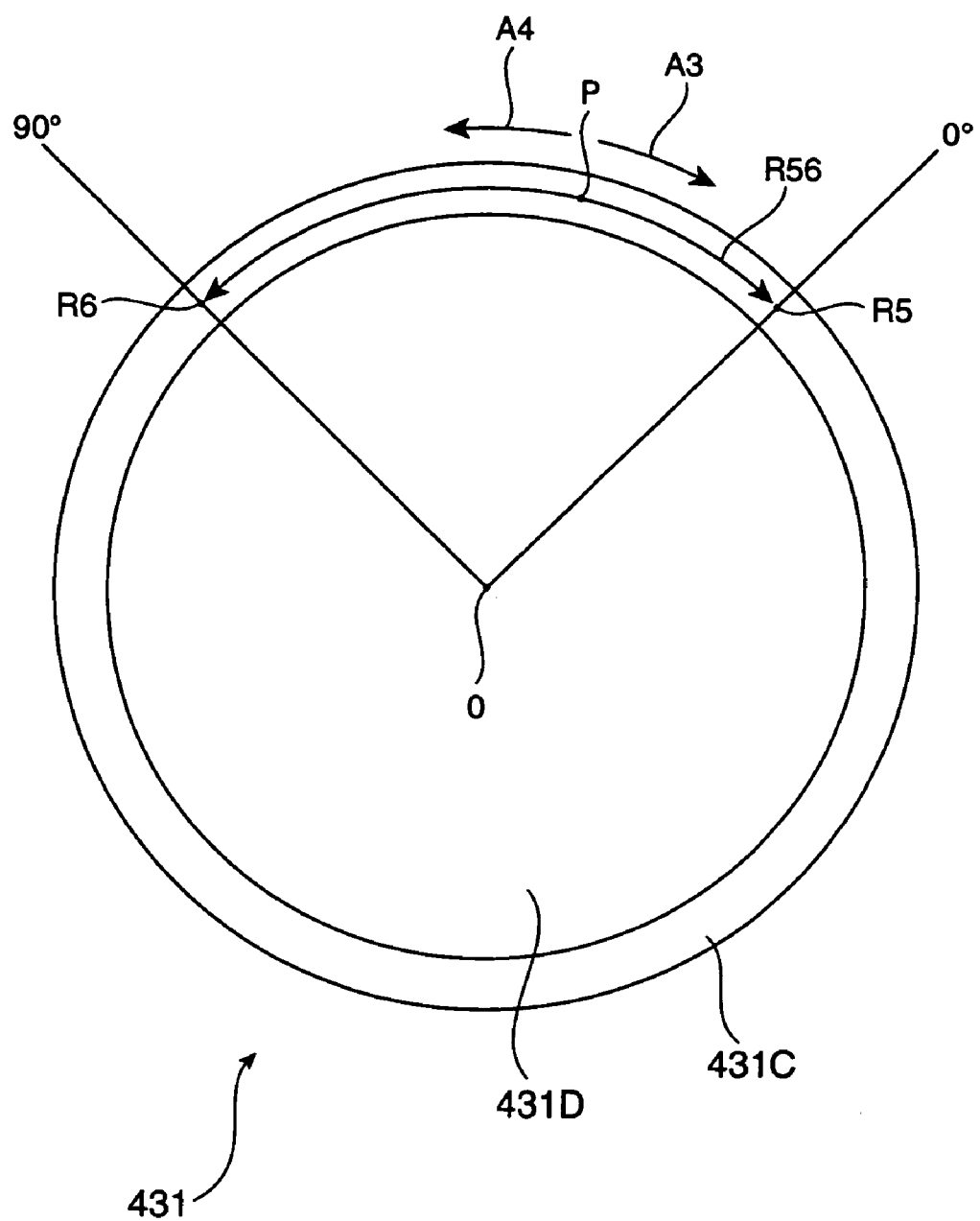
FIG. 8 is a diagram schematically illustrating the structure of a zoom ring and a zoom lens according to a second embodiment.

FIG. 8 is a diagram schematically illustrating the structure of the zoom ring 431C and the zoom lens 431D according to the second embodiment. More specifically, FIG. 8 is a diagram illustrating the zoom ring 431C and the zoom lens 431D, as viewed in the direction of the optical axis.

The zoom ring 431C is one of a plurality of members constituting the lens-barrel of the projection lens 431, and supports the zoom lens 431D, similar to the focus ring 431A, as shown in FIG. 8. In addition, the zoom lens 431D may be composed of a single lens or a group of lenses, similar to the focus lens 431B described in the first embodiment. Alternatively, the zoom lens 431D may be composed of a plurality of lens groups, and the zoom ring 431C may support at least one of the plurality of lens groups. The zoom ring 431C is formed so as to rotate with respect to the other members on an optical axis O of the zoom lens 431D. The rotation of the zoom ring 431C causes the zoom lens 431D to move in the direction of the optical axis with respect to the other lenses, so that the position of the zoom lens 431D with respect to the other lenses (zoom position), which is the relative position of the plurality of lenses, is changed. In this way, the zoom adjustment of a projected image is performed. That is, the rotation angle of the zoom ring 431C corresponds to the zoom position.

More specifically, as shown in FIG. 8, when the zoom ring 431C is rotated from the predetermined position P in the direction of arrow A3, the zoom position is changed to a tele-end side where a projected image zooms out. On the other hand, when the zoom ring 431C is changed from the predetermined position P in the direction of arrow A4, the zoom position is changed to a wide-end side where the projected image zooms in.

Further, in this embodiment, as shown in FIG. 8, the predetermined position P can be changed in a range of R5 (for example, 0°) to R6 (for example, 90°). That is, a mechanical limit range R56 where the zoom ring 431C can rotate mechanically is set in a range from a tele-end-side zoom position R5 to a wide-end-side zoom position R6, as shown in FIG. 8.

Furthermore, in this embodiment, when the zoom ring 431C is rotated with respect to the other lenses to change the zoom position, a focal distance f of the projection lens 431 is changed.

Moreover, in this embodiment, the zoom ring 431C is formed such that it can be rotated by a user, and corresponds to a zoom position changing unit according to the invention. In addition, the zoom ring 431C may be automatically rotated by, for example, a motor, similar to the structure described in the first embodiment in which the focus ring 431A is automatically rotated by the lens driving unit 432.

The range information storage unit 753 stores variable range information related to the rotatable range required for the automatic adjustment control unit 742 to perform automatic adjustment control.

Figure 9:
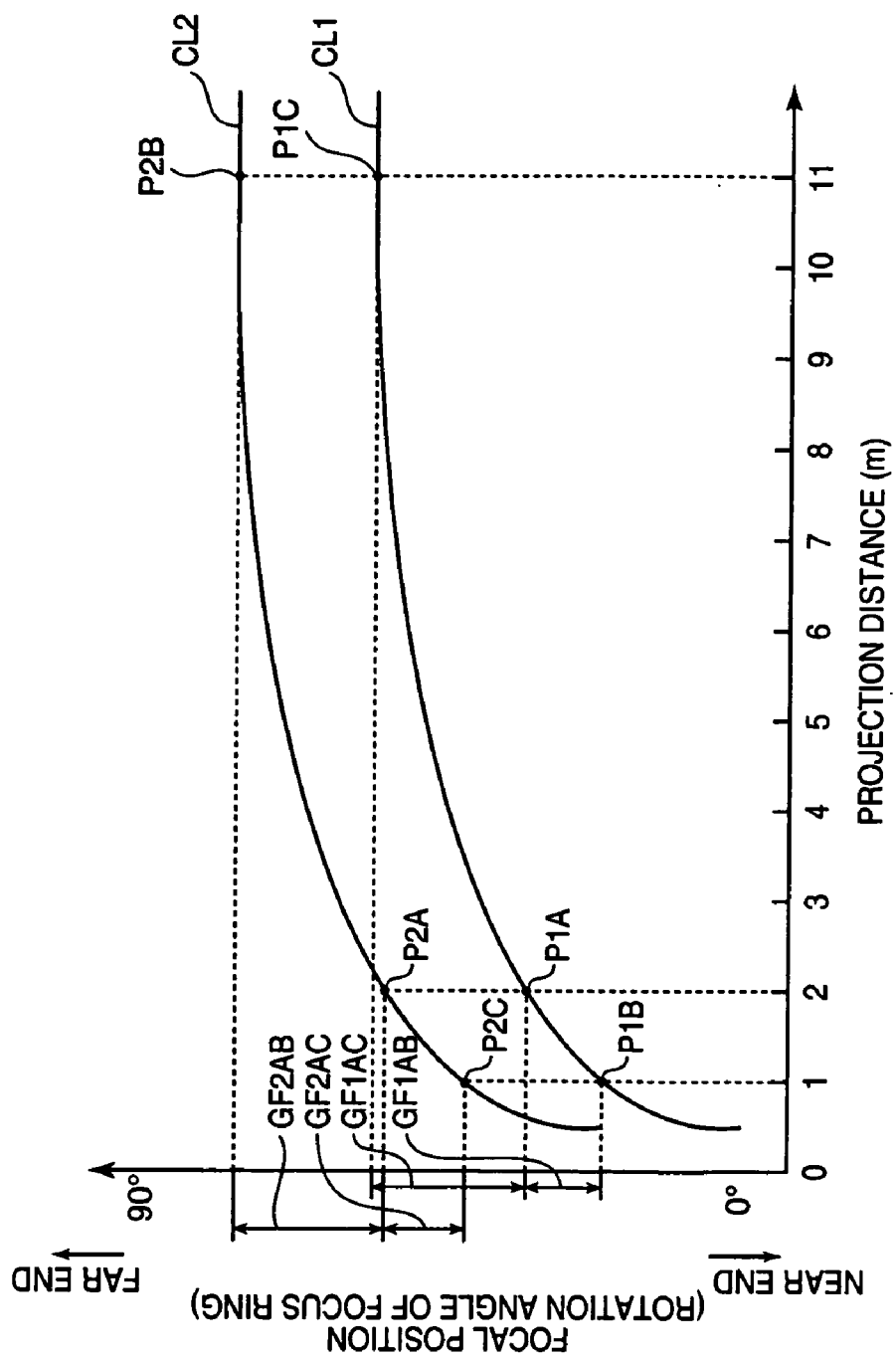
FIG. 9 is a diagram illustrating a method of setting near-end-side and far-end-side limit positions of the rotatable range in the automatic adjustment control according to the second embodiment.
Figure 10:
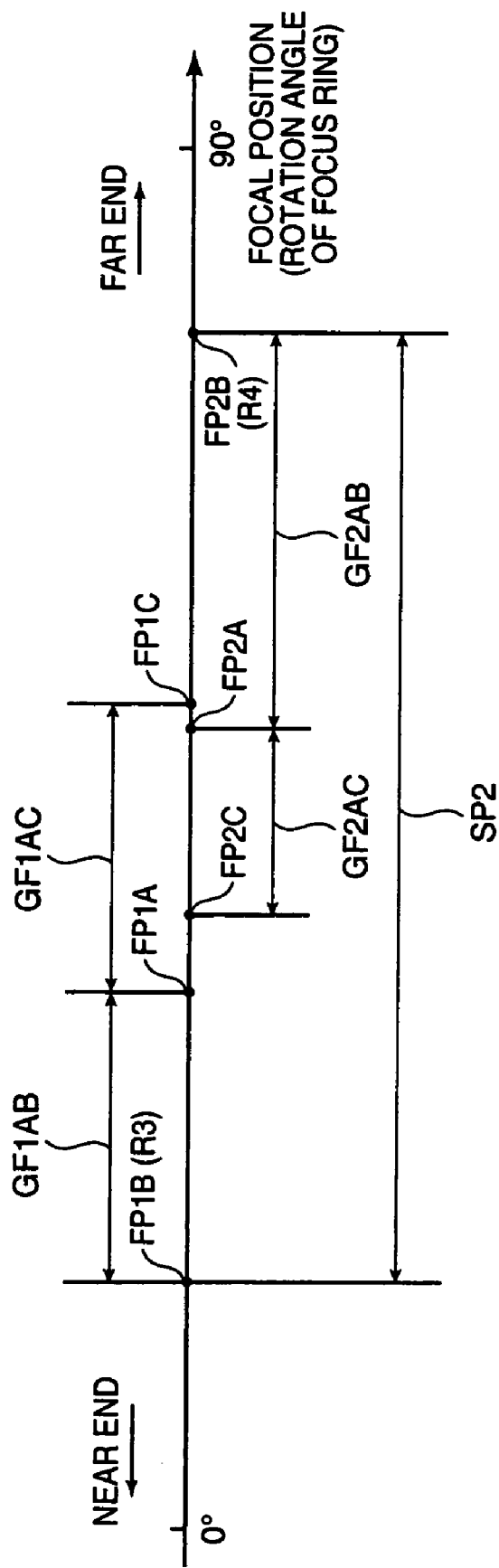
FIG. 10 is a diagram illustrating the method of setting the near-end-side and far-end-side limit positions of the rotatable range in the automatic adjustment control according to the second embodiment.

FIGS. 9 and 10 are diagrams illustrating an example of a method of setting the near-end-side and far-end-side limit positions R3 and R4 of the rotatable range SP2 in the automatic adjustment control according to the second embodiment. In FIG. 9, the horizontal axis indicates a projection distance, and the vertical axis indicates the rotation angle of the focus ring (focal position).

In this embodiment, the near-end-side and far-end-side limit positions R3 and R4 of the rotatable range SP2 in the automatic adjustment control are se as follows. In the following description, it is assumed that the shortest projection distance of the projection lens 431 is 1 m and the longest projection distance thereof is 11 m.

First, when manufacturing the projector 1, the operator arranges the projector 1 at a predetermined distance (for example, 2 m) from the screen Sc, and operates the projector 1 to display an adjustment pattern image on the screen Sc. Then, the operator rotates the zoom ring 431C constituting the projection lens 431 to set the focal position to the tele-end-side zoom position R5. Subsequently, the operator rotates the focus ring 431A to perform focus adjustment such that the adjustment pattern image is in an in-focus state, and then measures the rotation angle (a first focal position) of the focus ring 431A where the adjustment pattern image is in the in-focus state at a predetermined distance. Then, the operator rotates the zoom ring 431C to set the focal position to the wide-end-side zoom position R6, and perform focus adjustment similar to the above. Subsequently, the operator measures the rotation angle (a second focal position) of the focus ring 431A where the adjustment pattern image is in the in-focus state at a predetermined distance.

Thereafter, the operator calculates a near-end-side focal position, which is the near-end-side limit position in the rotatable range, and a far-end-side focal position, which is the far-end-side limit position in the rotatable range, on the basis of the first and second focal positions measured and optical characteristics corresponding to the specifications of the projection lens 431.

For example, when the projection distance is D (m), the focal distance is f (m), and the rotation angle of the focus ring 431A is R (rad), the optical characteristics are obtained by the following expression 1:

$$D=(-C1\cdot f^2)/(C2-R)+C3. \quad\quad \text{[Expression 1]}$$

In the expression 1, 'C1' is a coefficient determined by the design of the lens and by the units of D, R, and f. 'C2' is the position of the lens when the projection distance is infinite (∞) and is changed according to the zoom position, which is the rotation angle of the zoon ring 431C. 'C3' is a coefficient determined by the design of the lens. 'f' is related to a function corresponding to the focal position, which is the rotation angle of the focus ring 431A and the zoom position, which is the rotation angle of the zoom ring 431C.

That is, as shown in FIG. 9, the operator can recognize a curved line indicating the relationship between the focal position and the projection distance at a predetermined zoom position (for example, a curved line CL1 indicating the relationship at the tele-end-side zoom position R5 or a curved line CL2 indicating the relationship at the wide-end-side zoom position R6), according to the optical characteristics. More specifically, the values of C1, f, and C3 in the expression 1 are substantially equal to the design values of the projection lens 431, but the value of C2 may be greatly changed due to the manufacturing error or margin of the projection lens 431. Therefore, it is possible to specify the value of C2 peculiar to the projection lens 431 by measuring the first or second focal position. In addition, the specified value of C2 enables the operator to recognize a curved line indicating the relationship between the focal position and the projection distance at a predetermined zoom position peculiar to the projection lens 431 (for example, the curved line CL1 indicating the relationship at the tele-end-side zoom position R5 or the curved line CL2 indicating the relationship at the wide-end-side zoom position R6), on the basis of the expression 1.

Further, the operator can recognize a difference in focal position between two points having different projection distances, on the basis of the curved line the predetermined zoom position. For example, as shown in FIG. 9, on the curved lines CL1 and CL2 at the tele-end-side focal position R5 and the wide-end-side focal position R6, the operator can recognize a difference GF1AB (a minus value) between the focal position (the first focal position) of a point P1A corresponding to the predetermined distance and the focal position (the shortest tele-end-side focal position) of a point P1B corresponding to the shortest projection distance (1 m), a difference GF1AC between the focal position (the first focal position) of the point P1A and the focal position (the longest tele-end-side focal position) of a point P1C corresponding to the longest projection distance (11 m), a difference GF2AB between the focal position (the second focal position) of a point P2A corresponding to the predetermined distance and the focal position (the longest wide-end-side focal position) of a point P2B corresponding to the longest projection distance (11 m), and a difference GF2AC between the focal position (the second focal position) of the point P2A and the focal position (the shortest wide-end-side focal position) of a point P2C corresponding to the shortest projection distance (1 m).

As shown in FIG. 10, the operator calculates a shortest tele-end-side focal position FPLB and a longest tele-end-side focal position FPLC by adding the differences GF1AB and GF1AC to the first focal position FP1A, and calculates a longest wide-end-side focal position FP2B and a shortest wide-end-side focal position FP2C by adding the differences GF2AB and GF2AC to the second focal position FP2A. Then, when manufacturing the projector 1, the operator sets the near-end-side focal position (the shortest tele-end-side focal position FPLB in FIGS. 9 and 10) of the shortest tele-end-side focal position FPLB and the shortest wide-end-side focal position FP2C as the initial position R3 (the near-end-side limit position) of the rotatable range SP2 in the automatic adjustment control. In addition, the operator sets the far-end-side focal position (the longest wide-end-side focal position FP2B in FIGS. 9 and 10) of the longest wide-end-side focal position FP2B and the longest tele-end-side focal position FPLC as the far-end-side limit position R4 of the rotatable range SP2 in the automatic adjustment control. Then, the operator stores, in the range information storage unit 753, information related to the near-end-side limit position R3 and the far-end-side limit position R4 (the rotation angle of the focus ring 431A) as variable range information.

The curved lines CL1 and CL2 at the tele-end-side zoom position R5 and the wide-end-side zoom position R6 have different patterns from those of the curved lines shown in FIG. 9, according to the design or type of the projection lens 431.

Figure 11:
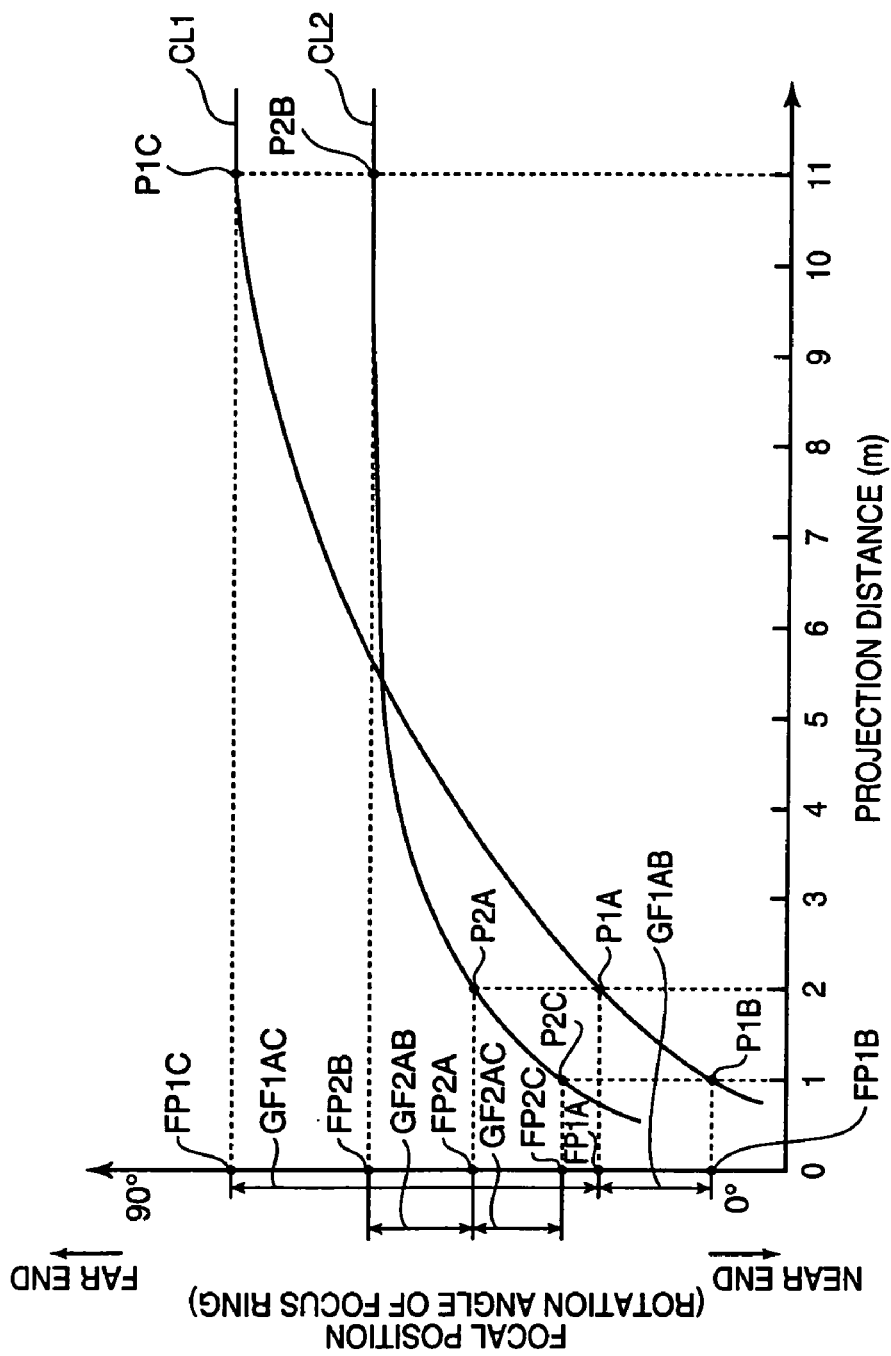
FIG. 11 is a diagram illustrating curved lines having different patterns according to the second embodiment.
Figure 12:
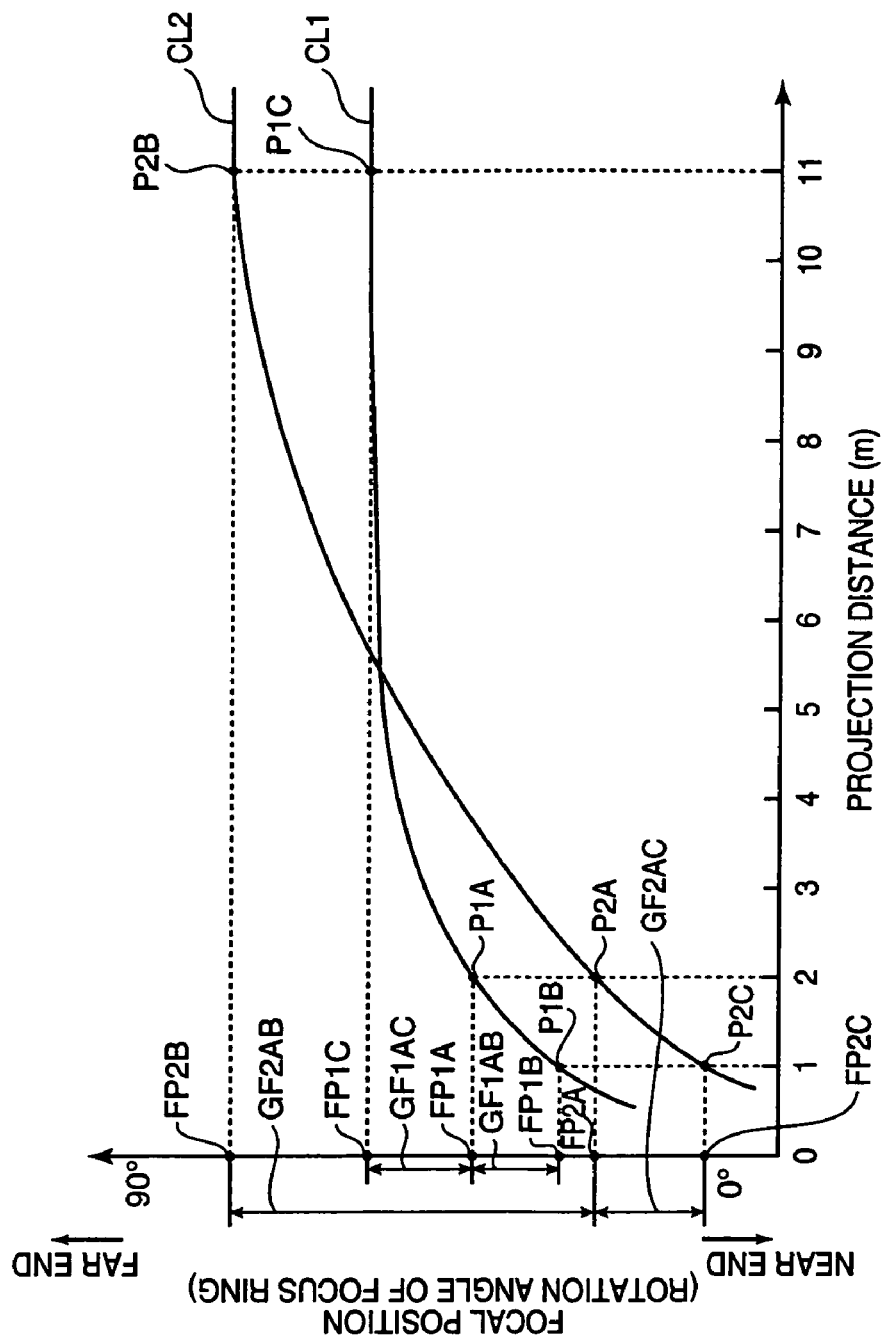
FIG. 12 is a diagram illustrating curved lines having different patterns according to the second embodiment.
Figure 13:
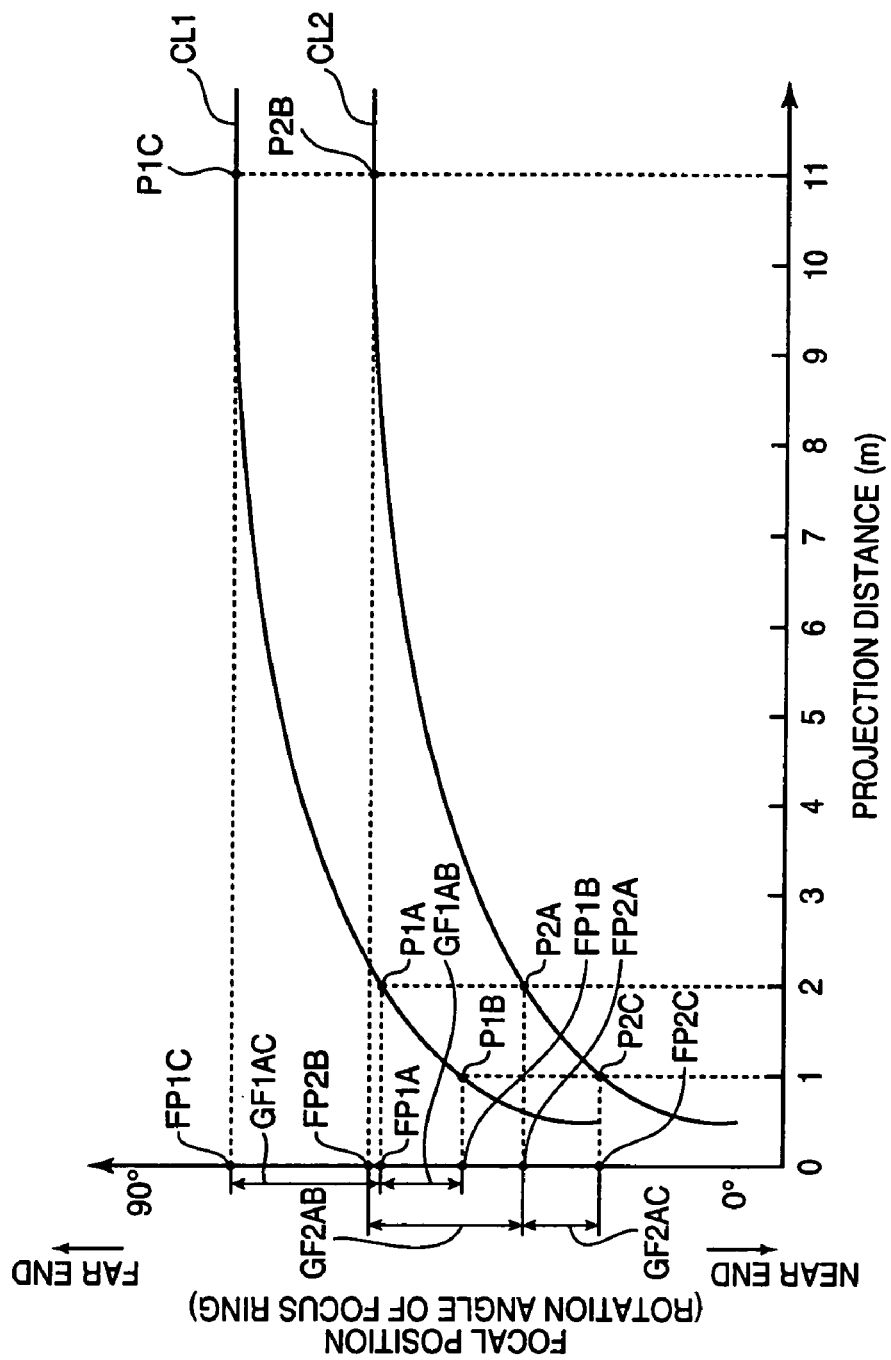
FIG. 13 is a diagram illustrating curved lines having different patterns according to the second embodiment.

FIGS. 11 to 13 are diagrams illustrating curved lines having different patterns from those of the curved lines CL1 and CL2.

For example, in FIG. 11, the shortest tele-end-side focal position FP1B of the shortest wide-end-side focal position FP2C and the shortest tele-end-side focal position FP1B is located at the near end side. In addition, the longest tele-end-side focal position FP1C of the longest wide-end-side focal position FP2B and the longest tele-end-side focal position FP1C is located at the far end side. In this case, the operator determines the shortest tele-end-side focal position FP1B and the longest tele-end-side focal position FP1C as the near-end-side limit position R3 and the far-end-side limit position R4, respectively, by using the above-mentioned method.

Further, for example, in FIG. 12, the shortest wide-end-side focal position FP2C of the shortest tele-end-side focal position FP1B and the shortest wide-end-side focal position FP2C is located at the near end side. In addition, the longest wide-end-side focal position FP2B of the longest tele-end-side focal position FPLC and the longest wide-end-side focal position FP2B is located at the far end side. In this case, the operator determines the shortest wide-end-side focal position FP2C and the longest wide-end-side focal position FP2B as the near-end-side limit position R3 and the far-end-side limit position R4, respectively, by using the above-mentioned method.

Furthermore, for example, in FIG. 13, the shortest wide-end-side focal position FP2C of the shortest tele-end-side focal position FPLB and the shortest wide-end-side focal position FP2C is located at the near end side. In addition, the longest tele-end-side focal position FP1C of the longest wide-end-side focal position FP2B and the longest tele-end-side focal position FP1C is located at the far end side. In this case, the operator determines the shortest wide-end-side focal position FP2C and the longest tele-end-side focal position FP1C as the near-end-side limit position R3 and the far-end-side limit position R4, respectively, by using the above-mentioned method.

In the above-mentioned structure, the first and second focal positions are measured by using the projector 1, which is a finished product, but the invention is not limited thereto. For example, the first and second focal positions may be measured by using a projector equipped with a reference projection lens (master lens) having standard optical characteristics.

In this embodiment, the focus adjustment control is performed in the same manner as that in which the focus adjustment control (the manual adjustment control and the automatic adjustment control) is performed in the first embodiment, and thus a description thereof will be omitted.

The second embodiment has the following effects in addition to the effects obtained from the first embodiment.

Figure 14:
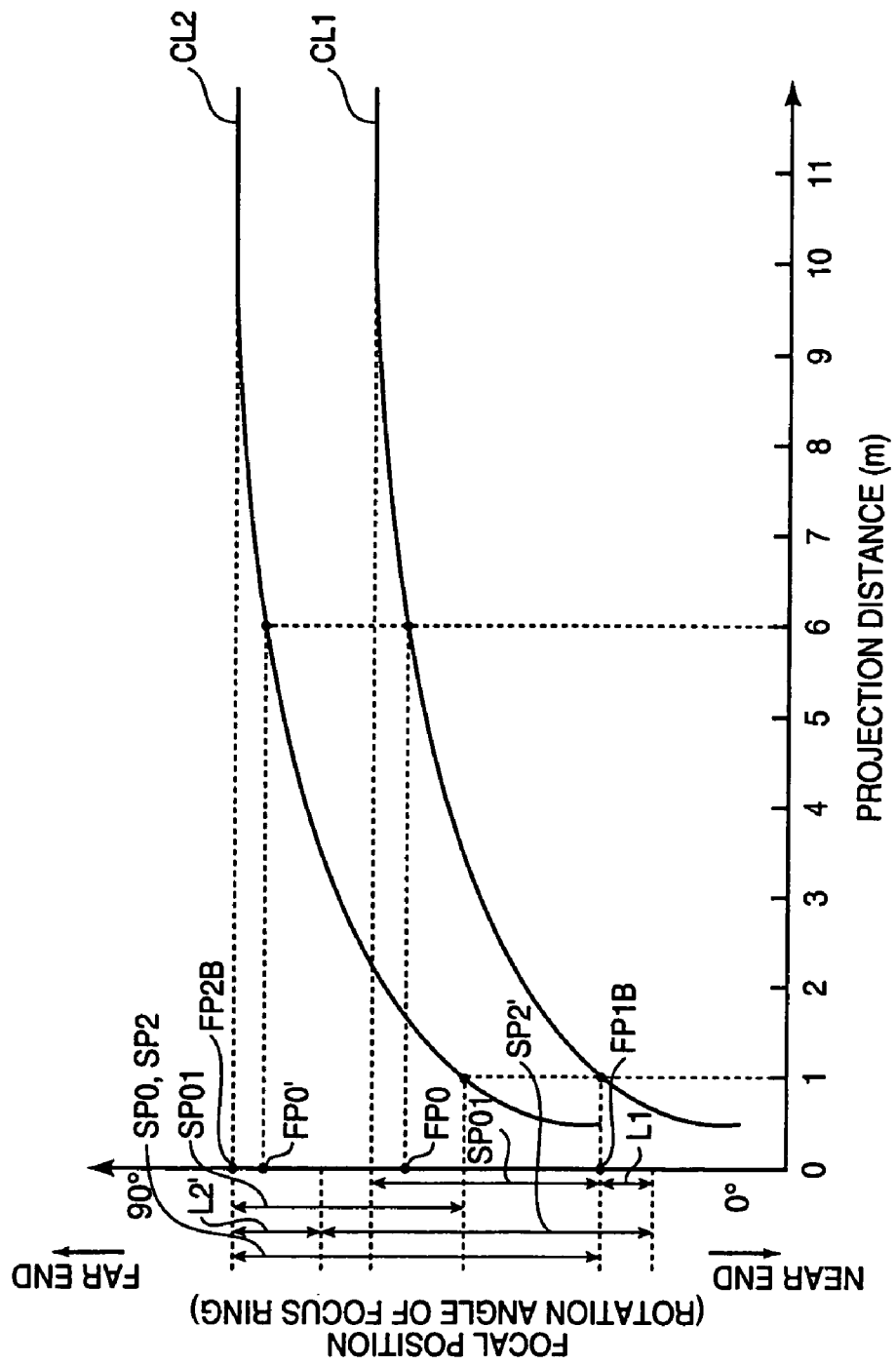
FIG. 14 is a diagram illustrating the effects of the second embodiment.

FIG. 14 is a diagram illustrating the effects of the second embodiment. More specifically, FIG. 14 corresponds to FIGS. 9 and 10.

As shown in FIG. 14, in a case in which the zoom position is set to the tele-end-side zoom position R5 and the focal position is set to a focal position FP0 where a projected image is in the in-focus state at a predetermined projected distance (about 6 m), when the zoom position is changed to the wide-end-side zoom position, the projected image deviates from the in-focus state at the predetermined distance. Thus, in this case, the focal position FP0 should be changed to a focal position FP0'. That is, when both focus adjustment and zoom adjustment are performed as in this embodiment, the zoom-in or zoom-out of the projected image causes a change in the focal distance of the projection lens, and the change of the zoom position by zoom adjustment has an effect on the focus adjustment of the projection lens 431. When the rotatable range in the automatic adjustment control is set to a rotatable range SP2' which is narrower than the mechanical limit range SP1' without considering the zoom position, as shown in FIG. 14, the focal position is changed up to a range L1 where a projected image is not in the in-focus state at a predetermined zoom position, or it is difficult to change the focal position to a range L2 where a projected image is in the in-focus state at a predetermined zoom position. Therefore, it is difficult to perform automatic adjustment control in an effective rotatable range SP01 where the projected image should be in the in-focus state between the shortest projection distance and the longest projection distance which are determined by the specifications of the projection lens 431 at a predetermined zoom position.

However, in this embodiment, the near-end-side limit position R3 of the rotatable range SP2 is set to the near-end-side focal position (the shortest tele-end-side focal position FPLB in FIG. 14) of the shortest tele-end-side focal position FP1B and the shortest wide-end-side focal position FP2C. Therefore, it is possible to set the near-end-side limit position R3 of the rotatable range SP2 in the automatic adjustment control to the near-end-side limit position of the entire effective rotatable range SP0 (FIG. 14) where the projected image should be in the in-focus state between the shortest projection distance and the longest projection distance which are determined by the specifications of the projection lens 431 even when the zoom position is changed between the tele-end R5 and the wide-end R6. In addition, the far-end-side limit position R4 of the rotatable range SP2 is set to the far-end-side focal position (the longest wide-end-side focal position FP2B in FIG. 14) of the longest tele-end-side focal position FP1C and the longest wide-end-side focal position FP2B, which makes it possible to set the far-end-side limit position R4 of the rotatable range SP2 in the automatic adjustment control to the far-end-side limit position of the entire effective rotatable range SP0. That is, it is possible to make the rotatable range SP2 and the entire effective rotatable range SP0 equal to each other by setting the near-end-side limit position R3 and the far-end-side limit position R4 to the near-end-side focal position and the far-end-side focal position, respectively. Therefore, the focal position is not changed up to a position where a projected image is not in the in-focus state at a predetermined zoom position, or it is possible to change the focal position to a position where a projected image is in the in-focus state at a predetermined zoom position. Thus, it is possible to shorten the focus adjustment time and to perform automatic adjustment control in the effective rotatable range SP2 (the entire effective rotatable range SP0).

In this embodiment, the operator calculates the near-end-side focal position and the far-end-side focal position, on the basis of the first focal position FP1A and the second focal position FP2A actually measured where a projected image is in the in-focus state at a predetermined projected distance. Therefore, in this embodiment, it is possible to calculate the near-end-side focal position and the far-end-side focal position by setting the screen Sc and the projector 1 at a projection distance of, for example, 2 m and thus to more effectively use a working space during the manufacture of the projector 1, compared with a structure in which the near-end-side focal position and the far-end-side focal position are respectively set as the shortest projection distance and the longest projection distance actually measured.

Further, in this embodiment, the first focal position FP1A and the second focal position FP2A are actually measured, and the near-end-side focal position and the far-end-side focal position are calculated on the basis of the first focal position FP1A and the second focal position FP2A. In this way, even when manufacturing errors occur in the projection lens 431, it is possible to accurately calculate the near-end-side focal position and the far-end-side focal position, corresponding to the manufacturing errors, and to more effectively set the rotatable range SP2, on the basis of the near-end-side focal position and the far-end-side focal position, compared with a structure in which the focal positions FP1B, FP1C, FP2B, and FP2C (the focal positions FP1B and FP2B in FIGS. 9, 10, and 14) of the projection lens 431, which are values defined in the specifications of the projection lens 431, are used as they are.

Third Embodiment

Next, a third embodiment of the invention will be described with reference to the drawings.

In the third embodiment, the same components as those in the first and second embodiments have the same reference numerals, and thus a detailed description thereof will be omitted or simply made.

Figure 15:
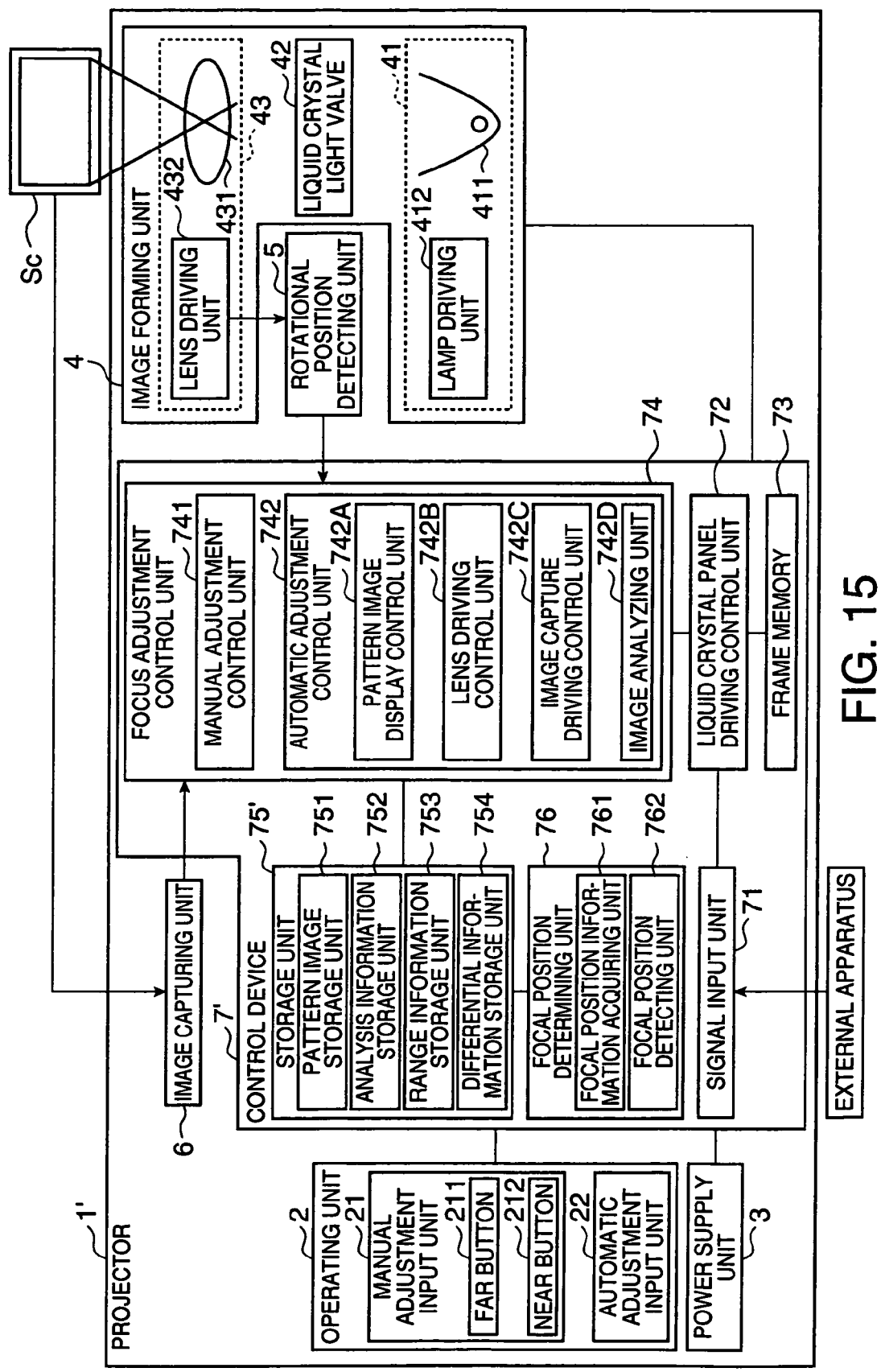
FIG. 15 is a block diagram illustrating the schematic structure of a projector according to a third embodiment.

FIG. 15 is a block diagram illustrating the schematic structure of a projector 1' according to the third embodiment.

In the second embodiment, the operator calculates the shortest tele-end-side focal position FP1B, the longest tele-end-side focal position FP1C, the shortest wide-end-side focal position FP2C, and the longest wide-end-side focal position FP2B, on the basis of the first focal position FP1A and the second focal position FP2A measured. In addition, the operator determines the near-end-side focal position of the calculated focal positions FP1B and FP2C as the near-end-side limit position R3 of the rotatable range SP2, and determines the far-end-side focal position of the calculated focal positions FP1C and FP2B as the far-end-side limit position R4 of the rotatable range SP2. Then, the operator stores information related to the limit positions R3 and R4 in the range information storage unit 753 as variable range information.

In contrast, in the third embodiment, as shown in FIG. 15, a control unit 7' constituting the projector 1' includes a focal position determining unit 76 and a storage unit 75' in addition to the signal input unit 71, the liquid crystal panel driving control unit 72, the frame memory 73, and the focus adjustment control unit 74. The storage unit 75' includes a differential information storage unit 754 in addition to the pattern image storage unit 751, the analysis information storage unit 752, and the range information storage unit 753. The control device 7' (the focal position determining unit 76) calculates the focal positions FP1B, FP1C, FP2B, and FP2C, and determines the near-end-side focal position of the focal positions FP1B and FP2C and the far-end-side focal position of the focal positions FP1C and FP2B as the near-end-side and far-end-side limit positions R3 and R4 of the rotatable range SP2, respectively. Then, the control device 7' stores information related to the limit positions R3 and R4 in the range information storage unit 753 as variable range information. In this embodiment, components other than the control device 7' have the same structure as those in the second embodiment.

On a curved line CL1 (FIG. 9 and FIGS. 11 to 13) indicating the relationship between the focal position and the projection distance at the tele-end-side zoom position R5 which can be recognized corresponding to the optical characteristics (for example, the expression 1) described in the second embodiment, the differential information storage unit 754 stores, as first differential information, differences GF1AB and GF1AC (FIG. 9 and FIGS. 11 to 13) between the focal position (the first focal position) of a point P1A corresponding to a predetermined projection distance (for example, 2 m) and the focal positions (the shortest tele-end-side focal position and the longest tele-end-side focal position) of points P1B and P1C (FIG. 9 and FIGS. 11 to 13) corresponding to the shortest projection distance (for example, 1 m) and the longest projection distance (for example, 11 m) such that the differences are associated with the corresponding zoom position (the tele-end-side zoom position R5). Similarly, on a curved line CL2 (FIG. 9 and FIGS. 11 to 13) indicating the relationship between the focal position and the projection distance at the wide-end-side zoom position R6 which can be recognized corresponding to the optical characteristics described in the second embodiment, the differential information storage unit 754 stores, as second differential information, differences GF2AC and GF2AB (FIG. 9 and FIGS. 11 to 13) between the focal position (the second focal position) of a point P2A (FIG. 9 and FIGS. 11 to 13) corresponding to a predetermined projection distance (for example, 2 m) and the focal positions (the shortest wide-end-side focal position and the longest wide-end-side focal position) of points P2C and P2B (FIG. 9 and FIGS. 11 to 13) corresponding to the shortest projection distance (for example, 1 m) and the longest projection distance (for example, 11 m) such that the differences are associated with the corresponding zoom position (the wide-end-side zoom position R6).

The users recognizes the design of the projection lens 431 and interindividual variation and then sets differential information related to the differences GF1AB, GF1AC, GF2AB, and GF2AC.

The focal position determining unit 76 calculates the near-end-side focal position and the far-end-side focal position. As shown in FIG. 11, the focal position determining unit 76 includes a focal position information acquiring unit 761 and a focal position calculating unit 762.

The focal position information acquiring unit 761 acquires a first focal position FP1A (FIGS. 10 to 13) where a projected image is in an in-focus state at the tele-end-side zoom position R5 and at a predetermined projection distance (for example, 2 m) and a second focal position FP2A (FIGS. 10 to 13) where a projected image is in an in-focus state at the wide-end-side zoom position R6 and at a predetermined projection distance (for example, 2 m). In this embodiment, the focal position information acquiring unit 761 acquires the focal positions detected by the rotational position detecting unit 5 as the first and second focal positions FP1A and FP2A.

In this structure, the focal position information acquiring unit 761 acquires the focal positions detected by the rotational position detecting unit 5 as the first and second focal positions FP1A and FP2A, but the invention is not limited thereto. For example, the focal positions may be acquired as follows.

The operating unit 2 is provided with a focal position setting input unit, and the user sets and inputs the first and second focal positions FP1A and FP2A using the focal position setting input unit. Then, the focal position information acquiring unit 761 acquires the first and second focal positions FP1A and FP2A on the basis of operating signals output from the focal position setting input unit.

In addition, for example, information related to the first and second focal positions FP1A and FP2A is input from an external apparatus through the signal input unit 71, and the focal position information acquiring unit 761 acquires the first and second focal positions FP1A and FP2A on the basis of the information.

Then, the focal position information acquiring unit 761 outputs, to the focal position calculating unit 762, signals corresponding to the first and second focal positions FP1A and FP2A acquired.

The focal position calculating unit 762 calculates the shortest tele-end-side focal position FPLB, the longest tele-end-side focal position FP1C, the shortest wide-end-side focal position FP2C, and the longest wide-end-side focal position FP2B, on the basis of the first and second focal positions FP1A and FP2A acquired by the focal position information acquiring unit 761 and the first and second differential information stored in the differential information storage unit 754. Then, the focal position calculating unit 762 compares the calculated shortest tele-end-side focal position FP1B with the calculated shortest wide-end-side focal position FP2C and sets the focal position at the near end side to the near-end-side focal position. In addition, the focal position calculating unit 762 compares the calculated longest tele-end-side focal position FPLC with the calculated longest wide-end-side focal position FP2B and sets the focal position at the far end side to the far-end-side focal position. Then, the focal position calculating unit 762 determines the near-end-side focal position and the far-end-side focal position as the near-end-side and far-end-side limit positions R3 and R4 of the rotatable range SP2, and stores information related to the limit positions R3 and R4 in the range information storage unit 753 as variable range information.

Next, a method of setting the rotatable range SP2 according to this embodiment will be described.

First, when manufacturing the projector 1', the operator arranges the projector 1' at a predetermine distance (for example, 2 m) from the screen Sc.

Then, the operator operates the zoom ring 431C to rotate the zoom ring 431C, thereby setting the zoom position to the tele-end-side zoom position R5.

Subsequently, the operator operates the operating unit 2 of the projector 1' to perform an input operation for calculating the shortest tele-end-side focal position FP1B and the longest tele-end-side focal position FP1C. The control device 7' receives the operating signals from the operating unit 2 and performs the following process according to predetermined programs stored in a memory (not shown).

First, the control device 7' performs the automatic adjustment control described in the first and second embodiments to set the focal position to the first focal position FP1A where an adjustment pattern image is in an in-focus state at the predetermined distance.

Next, the focal position information acquiring unit 761 acquires the first focal position FP1A, on the basis of the signal output from the rotational position detecting unit 5. Then, the focal position information acquiring unit 761 outputs a signal corresponding to the first focal position FP1A to the focal position calculating unit 762.

Successively, the focal position calculating unit 762 reads the differences GF1AB and GF1AC from the differential information storage unit 754, on the basis of the first differential information corresponding to the tele-end-side zoom position R5. Then, the focal position calculating unit 762 adds the read differences GF1AB and GF1AC to the first focal position FP1A, on the basis of the signal output from the focal position information acquiring unit 761, to calculate the shortest tele-end-side focal position FPLB and the longest tele-end-side focal position FP1C.

Further, the operator operates the zoom ring 431C to rotate the zoom ring 431C, thereby setting the zoom position to the wide-end-side zoom position R6.

Then, the operator operates the operating unit 2 of the projector 1' to perform an input operation for calculating the shortest wide-end-side focal position FP2C and the longest wide-end-side focal position FP2B. The control device 7' receives the operating signals from the operating unit 2 and performs the following process according to predetermined programs stored in a memory (not shown).

First, similar to the above, the control device 7' performs the automatic adjustment control described in the first and second embodiments to set the focal position to the second focal position FP2A where an adjustment pattern image is in an in-focus state at the predetermined distance.

Next, the focal position information acquiring unit 761 acquires the second focal position FP2A, on the basis of the signal output from the rotational position detecting unit 5. Then, the focal position information acquiring unit 761 outputs a signal corresponding to the second focal position FP2A to the focal position calculating unit 762.

Successively, the focal position calculating unit 762 reads the differences GF2AC and GF2AB from the differential information storage unit 754, on the basis of the second differential information corresponding to the wide-end-side zoom position R6. Then, the focal position calculating unit 762 adds the read differences GF2AC and GF2AB to the second focal position FP2A, on the basis of the signal output from the focal position information acquiring unit 761, to calculate the shortest wide-end-side focal position FP2C and the longest wide-end-side focal position FP2B.

Then, the operator operates the operating unit 2 of the projector 1' to perform an input operation for setting the near-end-side limit position R3 and the far-end-side limit position R4 of the rotatable range SP2. The control device 7' receives the operating signals from the operating unit 2 and performs the following process according to predetermined programs stored in a memory (not shown).

First, the focal position calculating unit 762 compares the calculated shortest tele-end-side focal position FP1B with the calculated shortest wide-end-side focal position FP2C and sets the focal position at the near end side to the near-end-side focal position (in FIGS. 9, 10, and 14, the shortest tele-end-side focal position FP1B). Then, the focal position calculating unit 762 determines the near-end-side focal position as the near-end-side limit position R3 of the rotatable range SP2, and stores information related to the limit position R3 in the range information storage unit 753 as variable range information.

Subsequently, the focal position calculating unit 762 compares the calculated longest tele-end-side focal position FP1C with the calculated longest wide-end-side focal position FP2B and sets the focal position at the far end side to the far-end-side focal position (in FIGS. 9, 10, and 14, the longest wide-end-side focal position FP2B). Then, the focal position calculating unit 762 determines the far-end-side focal position as the far-end-side limit position R4 of the rotatable range SP2, and stores information related to the limit position R4 in the range information storage unit 753 as variable range information.

Further, focus adjustment control by the projector 1' is the same as the focus adjustment control (manual adjustment control and automatic adjustment control) described in the first and second embodiments, and thus a description thereof will be omitted.

In the above-described third embodiment, the projector 1' calculates the near-end-side focal position and the far-end-side focal position, on the basis of the first and second focal positions FP1A and FP2A detected by the rotational position detecting unit 5 and the first and second differential information stored in the differential information storage unit 754, and determines the near-end-side focal position and the far-end-side focal position as the near-end-side limit position R3 and the far-end-side limit position R4 of the rotatable range SP2, respectively. Then, the projector 1' stores information related to the limit positions R3 and R4 in the range information storage unit 753 as variable information. Therefore, when the projector 1' is manufactured, it is unnecessary for the operator to calculate the near-end-side focal position and the far-end-side focal position on the basis of the first and second focal positions FP2A and FP2A. Thus, this embodiment makes it possible to more easily manufacture the projector 1' and to more improve convenience, compared with the second embodiment.

Further, the invention is not limited to the above-described embodiments, but various modifications and changes of the invention can be made without departing from the scope of the invention.

In the above-described embodiments, the near-end-side and far-end-side limit positions of the rotatable range in the automatic adjustment control are not limited to the initial position R3 and the limit position R4, respectively. The rotatable range in the automatic adjustment control may be set to be narrower than the mechanical limit range (the rotatable range in the manual adjustment control).

For example, in the first embodiment, in the rotatable range of the automatic adjustment control, the far-end-side limit position may be set to the limit position R4, and the near-end-side limit position may be set to a near-end-side design limit position N or a measured near-end-side limit position.

Further, for example, in the first embodiment, in the rotatable range of the automatic adjustment control, the near-end-side limit position may be set to the initial position R3, the near-end-side design limit position N, or the measured near-end-side limit position, and the far-end-side limit position may be set to a far-end-side design limit position F.

As described above, in the structure in which the near-end-side limit position and/or the far-end-side limit position are set to the near-end-side design limit position N and/or the far-end-side design limit position F, it is possible to use the design limit positions N and F measured by using the reference projection lens, as described in the first embodiment. Therefore, the structure makes it possible to more rapidly manufacture the projector 1, compared with a structure in which the near-end-side limit position and/or the far-end-side limit position actually measured for every projector 1, which is a finished product, are used as the near-end-side limit position and/or the far-end-side limit position.

In the second and third embodiments, the rotatable range SP2 is equal to the entire effective rotatable range SP0, but the invention is not limited thereto. That is, the rotatable range SP2 may differ from the entire effective rotatable range SP0. For example, the near-end-side limit position R3 of the rotatable range SP2 is set to the near-end-side focal position (in FIGS. 9, 10, and 14, the shortest tele-end-side focal position FP1B), and the far-end-side limit position of the rotatable range SP2 is set to be substantially the same as the far-end-side limit position of the mechanical limit range SP1'. In addition, for example, the far-end-side limit position R4 of the rotatable range SP2 is set to the far-end-side focal position (in FIGS. 9, 10, and 14, the longest wide-end-side focal position FP2B), and the near-end-side limit position of the rotatable range SP2 is set to be substantially the same as the near-end-side limit position of the mechanical limit range SP1'.

In the above-described embodiments, the mechanical limit range SP1' and the rotatable range SP1 in the manual adjustment control are equal to each other, but the invention is not limited thereto. That is, the mechanical limit range SP1' and the rotatable range SP1 may differ from each other.

Further, in the above-described embodiments, in the automatic adjustment control, the in-focus position is determined while the focus ring 431A is being rotated to change the focus lens 431B from the near end to the far end, but the invention is not limited thereto. For example, the following method may be used.

For example, in the automatic adjustment control, the focus ring 431A is rotated from the initial position R3 to the far-end-side limit position R4 to change the focus lens 431B from the near end to the far end. Then, from the relationship between the rotation angle of the focus ring 431A and a contrast value, the rotation angle of the focus ring 431A corresponding to a peak position where the contrast value is the maximum is determined as an in-focus position. Subsequently, the focus ring 431A is rotated to the in-focus position. That is, after the focus ring 431A is rotated in the entire rotatable range SP2, the in-focus position is determined.

In the first embodiment, when the measured near-end-side limit position is used to set the far-end-side limit position R4 in the automatic adjustment control, a rotation angle obtained by adding a predetermined angle to the measured near-end-side limit position is set as the far-end-side limit position R4, but the invention is not limited thereto. For example, the following structure may be used: information related to the measured near-end-side limit position is stored in the range information storage unit 753 as variable information; and when the automatic adjustment control unit 742 performs automatic adjustment control, the far-end-side limit position R4 is calculated by adding a predetermined angle to the measured near-end-side limit position, on the basis of the variable range information stored in the range information storage unit 753.

In the second embodiment, the operator calculates the near-end-side focal position and the far-end-side focal position by arithmetic computation, on the basis of the first and second focal positions FP1A and FP2A actually measured and the optical characteristics of the projection lens 431, but the invention is not limited thereto. For example, the following structure may be used.

For example, similar to the measurement of the first and second focal positions FP1A and FP2A, focus adjustment is performed at the tele-end and at the shortest projection distance to measure the shortest tele-end-side focal position FP1B, and the focus adjustment is performed at the tele-end and at the longest projection distance to measure the longest tele-end-side focal position FP1C. In addition, the focus adjustment is performed at the wide-end and at the shortest projection distance to measure the shortest wide-end-side focal position FP2C, and the focus adjustment is performed at the wide-end and at the longest projection distance to measure the longest wide-end-side focal position FP2B. Then, the operator sets, as the near-end-side focal position, one of the measured focal positions FP1B and FP2C located at the near end side, and sets, as the far-end-side focal position, one of the measured focal positions FP1C and FP2B located at the far end side. According to this structure, the near-end-side focal position and the far-end-side focal position are more precise values than the near-end-side focal position and the far-end-side focal position obtained in the second embodiment. Therefore, in this embodiment, since the near-end-side focal position and the far-end-side focal position having highly precise values are set to the limit positions R3 and R4, it is possible to set an effective rotatable range.

Further, for example, the focal positions FP1B, FP1C, FP2B, and FP2C defined in the specifications of the projection lens 431 may be used as the near-end-side focal position and the far-end-side focal position.

In the third embodiment, information related to the differences GF1AB, GF1AC, GF2AB, and GF2AC is used as the differential information, but the invention is not limited thereto. For example, information related to differences between the first focal position FP1A and the shortest tele-end-side focal position FP1B, the longest tele-end-side focal position FP1C, the shortest wide-end-side focal position FP2C, and the longest wide-end-side focal position FP2B may be used as the differential information. Alternatively, information related to differences between the second focal position FP2A and the shortest tele-end-side focal position FP1B, the longest tele-end-side focal position FP1C, the shortest wide-end-side focal position FP2C, and the longest wide-end-side focal position FP2B may be used as the differential information. In this structure, the focal position calculating unit 762 can calculate the focal positions FP1B, FP1C, FP2B, and FP2C, on the basis of one of the first and second focal positions FP1A and FP2A and the differences based on the differential information. Therefore, the structure makes it possible to more rapidly calculate the focal positions FP1B, FP1C, FP2B, and FP2C and to more rapidly manufacture the projector 1.

Furthermore, the following structure may be used: it is recognized whether one of the shortest tele-end-side focal position FP1B and the shortest wide-end-side focal position FP2C is at the near end side and whether one of the longest tele-end-side focal position FP1C and the longest wide-end-side focal position FP2B is at the far end side, from the curved lines CL1 and CL2 having different patterns due to the design of the projection lens 431 and interindividual variation; and information related to one of the differences GF1AB and GF2AC and information related to one of the differences GF1AC and GF2AB are stored in the differential information storage unit 754 as the differential information.

In the second and third embodiments, even when the zoom position is changed, the shortest projection distance and the longest projection distance of the projection lens 431 are set to be substantially uniform (for example, the shortest projection distance is 1 m, and the longest projection distance is 11 m). The shortest projection distance and the longest projection distance may be set to be changed according to the zoom position. For example, in the tele-end-side zoom position R5, the shortest projection distance is set to 1.2 m, and the longest projection distance is set to 12 m. In addition, in the wide-end-side zoom position R6, the shortest projection distance is set to 1 m, and the longest projection distance is set to 10 m.

In the second and third embodiments, the mechanical limit range SP1' is equal to the rotatable range SP1 in the manual adjustment control, but the invention is not limited thereto. For example, the rotatable range SP1 in the manual adjustment control may be equal to the rotatable range SP2 in the automatic adjustment control.

In the second and third embodiments, the first focal position FP1A is a focal position measured by performing focus adjustment at the tele-end and at a projection distance of 2 m, and the second focal position FP2A is a focal position measured by performing focus adjustment at the wide-end and at a projection distance of 2 m. However, the invention is not limited thereto. For example, the following focal positions may be used.

For example, the first focal position FP1A may be a focal position measured by performing focus adjustment at the tele-end and at the shortest projection distance.

Further, the first focal position FP1A may be a focal position measured by performing focus adjustment at the tele-end and at the longest projection distance.

Furthermore, the second focal position FP2A may be a focal position measured by performing focus adjustment at the wide-end and at the shortest projection distance.

Moreover, the second focal position FP2A may be a focal position measured by performing focus adjustment at the wide-end and at the longest projection distance.

In the above-described embodiments, the transmissive liquid crystal panel (the liquid crystal light valve 42) is used, but the invention is not limited thereto. For example, a reflective liquid crystal panel or Digital Micro-mirror Device (trademark of Texas Instruments Incorporated) may be used.

The preferred embodiments of the invention have been described above, but the invention is not limited thereto. That is, although the invention has been illustrated and described in terms of various specific embodiments, those skilled in the art will recognize that various modifications and changes (the shape, material, and number of components) of the invention can be made without departing from the technical scope and spirit of the invention.

Therefore, in the above-described embodiments, the shape, material, and number of components are just illustrative examples for the purpose of understanding the invention, but the invention is not limited thereto. Therefore, modifications of the shape, material, and number of components are also included in the invention.

Since the projector of the invention can perform automatic adjustment control to shorten a focus adjustment time, it can be effectively used for a home theater system or a presentation system.

The entire disclosure of Japanese Patent Application Nos. 2005-1643 filed Jan. 6, 2005 and 2005-162438 filed Jun. 2, 2005 are expressly incorporated by reference herein.

What is claimed is:

1. A projector comprising:
    a light modulating device which modulates light beams emitted from a light source according to image information to form an optical image;
    a projection optical device which enlarges and projects the optical image onto a screen, the projection optical device including a projection lens which has a plurality of lenses and enlarges and projects the optical image onto the screen by means of the plurality of lenses; and a focal position changing unit which changes a focal position, which is a relative position of the plurality of lenses, to perform focus adjustment on the image enlarged and projected onto the screen;
    a setting input unit through which automatic adjustment information for changing the focal position to an in-focus position where the projected image is in an in-focus state is input; and
    a focus adjustment control unit which performs automatic adjustment control in which the focal position changing unit is driven until the projected image is in the in-focus state to change the focal position, on the basis of the automatic adjustment information, and
    when a variable range is defined as a range in which the focal position can be changed from a near end where the projected image can be adjusted to the in-focus state when a projection distance to the screen is short to a far end where the projected image can be adjusted to the in-focus state when the projection distance to the screen is long, the variable range in the automatic adjustment control is set to be narrower than a variable range where the relative position of the plurality of lenses can be mechanically changed,
    wherein the variable range in the automatic adjustment control is set to a range from a tele-end-side zoom position, where the projected image has a minimum image contour, to a wide-end-side zoom position where the projected image has a maximum image countour, and
    wherein the variable range in the automatic adjustment control is set to be narrower at the far end than the variable range where the focal position can be mechanically changed.

2. The projector according to claim 1,
    wherein the setting input unit is formed such that it can have manual adjustment information for changing the focal position by a predetermined amount input thereto,
    the focus adjustment control unit performs manual adjustment control in which the focal position changing unit is driven to change the focal position by a predetermined amount, on the basis of the manual adjustment information, and
    the variable range in the automatic adjustment control is set to be narrower than the variable range in the manual adjustment control.

3. The projector according to claim 1,
    wherein the projection lens has a set of specifications, and
    wherein a far-end-side limit position of the variable range in the automatic adjustment control is set to the focal position where the projected image is in the in-focus state at a longest projection distance as defined by the specifications of the projection lens.

4. The projector according to claim 1,
    wherein the projection lens has a set of specifications, and
    wherein a far-end-side limit position of the variable range in the automatic adjustment control is set corresponding to the focal position where the projected image is in the in-focus state at a shortest projection distance defined by the specifications of the projection lens.

5. The projector according to claim 1,
    wherein the projection lens has a set of specifications,
    wherein the projection optical device further includes a zoom position changing unit which changes a zoom position, which is the relative position of the plurality of lenses, to perform zoom adjustment on the projected image, the zoom position changing unit is formed so as to change the zoom position from a tele-end-side zoom position where the projected image has a minimum image contour to a wide-end-side zoom position where the projected image has a maximum image contour, at least one of near-end-side and far-end-side limit positions of the variable range in the automatic adjustment control is set to one of near-end-side and far-end-side focal positions, of a shortest tele-end-side focal position where the projected image is in the in-focus state at the shortest projection distance defined by the specifications of the projection lens when the zoom position is the tele-end-side zoom position and a shortest wide-end-side focal position where the projected image is in the in-focus state at the shortest projection distance when the zoom position is the wide-end-side zoom position, the near-end-side focal position is the focal position at the near end side, and of a longest tele-end-side focal position where the projected image is in the in-focus state at the longest projection distance defined in the specifications of the projection lens when the zoom position is the tele-end-side zoom position and a longest wide-end-side focal position where the projected image is in the in-focus state at the longest projection distance when the zoom position is the wide-end-side zoom position, the far-end-side focal position is the focal position at the far end side.

6. The projector according to claim 5, further comprising:

a differential information storage unit which stores differential information related to a difference between at least one of a first focal position where the projected image is in the in-focus state when the zoom position is the tele-end-side zoom position and when the projection distance is a predetermined distance and a second focal position where the projected image is in the in-focus state when the zoom position is the wide-end-side zoom position and when the projection distance is the predetermined distance and at least one of the shortest tele-end-side focal position, the longest tele-end-side focal position, the shortest wide-end-side focal position, and the longest wide-end-side focal position;

a focal position information acquiring unit which acquires focal position information related to the focal position; and a focal position calculating unit which calculates at least one of the near-end-side focal position and the far-end-side focal position, on the basis of the focal position information and the differential information.

7. The projector according to claim 1, wherein the projection lens further includes a focus ring which accommodates and supports at least one of the plurality of lenses and rotates on the optical axis of the plurality of lenses to change the focal position, the focal position changing unit rotates the focus ring to change the focal position, the projector further includes:

a rotational position detecting unit which detects a rotational position of the focus ring; and a range information storage unit which stores variable range information related to rotational positions of the focus ring corresponding to the near-end-side and far-end-side limit positions of the variable range in the automatic adjustment control, and the focus adjustment control unit performs the automatic adjustment control within the variable range, on the basis of the rotational position of the focus ring detected by the rotational position detecting unit and the variable range information stored in the range information storage unit.

* * * * *